United States Patent
He et al.

(10) Patent No.: US 7,684,112 B2
(45) Date of Patent: Mar. 23, 2010

(54) BACKWARD STIMULATED RAYLEIGH-BRAGG SCATTERING DEVICES BASED ON MULTI-PHOTON ABSORBING MATERIALS AND THEIR APPLICATIONS

(75) Inventors: Guang S. He, Williamsville, NY (US); Paras N. Prasad, Williamsville, NY (US)

(73) Assignee: The Research Foundation of State University of New York, Amherst, NY (US)

( * ) Notice: Subject to any disclaimer, the term of this patent is extended or adjusted under 35 U.S.C. 154(b) by 0 days.

(21) Appl. No.: 12/139,014

(22) Filed: Jun. 13, 2008

(65) Prior Publication Data
US 2009/0034561 A1  Feb. 5, 2009

Related U.S. Application Data

(62) Division of application No. 11/054,160, filed on Feb. 9, 2005, now abandoned.

(60) Provisional application No. 60/543,181, filed on Feb. 10, 2004.

(51) Int. Cl.
*H01S 3/00*   (2006.01)
*H01S 3/213*  (2006.01)

(52) U.S. Cl. .................. 359/334; 359/326; 359/342; 372/53

(58) Field of Classification Search .......... 359/326, 359/334, 362; 372/53
See application file for complete search history.

(56) References Cited

U.S. PATENT DOCUMENTS

| H499 H | 7/1988 | Lin |
|---|---|---|
| 5,379,147 A | 1/1995 | Cook |
| 5,912,257 A | 6/1999 | Prasad et al. |
| 6,402,037 B1 | 6/2002 | Prasad et al. |
| 2003/0107027 A1 | 6/2003 | Huang et al. |
| 2003/0201713 A1 | 10/2003 | Huang et al. |
| 2004/0132960 A1 | 7/2004 | Huang et al. |
| 2005/0249248 A1 | 11/2005 | He et al. |

OTHER PUBLICATIONS

Batra & Ennis, "Stimulated Thermal Rayleigh Scattering in Liquids," *Phys. Rev.* 185(1):396-9 (1969).
Bespalov et al., "Stimulated Thermal Scattering of Short Light Pulses," *Phys. Rev. Lett.* 24(23):1274-6 (1970).
Boissel et al., "Diffusion Stimulée Induite Par Une Absorption a Deux Photons," *J. Physique Lett.* 39:L-319-L-322 (1978).
Brewer & Townes, "Standing Waves in Self-trapped Light Filaments," *Phys. Rev. Lett.* 18(6):196-200 (1967).
Chiao et al., "Stimulated Brillouin Scattering and Coherent Generation of Intense Hypersonic Waves," *Phys. Rev. Lett.* 12(21):592-5 (1964).
Cho et al., "Stimulated Thermal Rayleigh Scattering in Liquids," *Phys. Rev.* 175(1):271-4 (1968).

(Continued)

*Primary Examiner*—Eric Bolda
(74) *Attorney, Agent, or Firm*—Nixon Peabody LLP

(57) ABSTRACT

The present invention relates to a method and system of generating backward stimulated Rayleigh-Bragg scattering by focusing activating radiation through a multi-photon absorbing dye solution, thereby producing coherent output radiation with no measured frequency shift and measured pump threshold values independent of the spectral line width of the input activating radiation.

15 Claims, 22 Drawing Sheets

OTHER PUBLICATIONS

Chung et al., "Cooperative Enhancement of Two-photon Absorption in Multi-branched Structures," *J. Phys. Chem. B* 103:10741-5 (1999).

Darée & Kaiser, "Competition Between Stimulated Brillouin and Rayleigh Scattering in Absorbing Media," *Phys. Rev. Lett.* 26(14):816-9 (1971).

Eckhardt et al., "Stimulated Raman Scattering from Organic Liquids," *Phys. Rev. Lett.* 9(11):455-7 (1962).

Gray & Herman, "Nonlinear Thermal Rayleigh Scattering in Gases," *Phys. Rev.* 181(1):374-9 (1969).

He & Prasad, "Stimulated Kerr Scattering and Reorientation Work of Molecules in Liquid $CS_2$," *Phys. Rev. A* 41(5):2687-97 (1990).

He et al., "Degenerate Two-photon-absorption Spectral Studies of Highly Two-photon Active Organic Chromophores," *J. Chem. Phys.* 120(11):5275-84 (2004).

He et al., "Nonlinear Optical Stabilization of 1064-nm Laser Pulses with a Two-photon Absorbing Liquid-dye Salt System," *Applied Optics* 44(17):3560-4 (2005).

He et al., "Stimulated Rayleigh-Bragg Scattering Enhanced by Two-photon Excitation," *Optics Express* 12(24):5952-61 (2004).

He et al., "Stimulated Rayleigh-Bragg Scattering in Two-photon Absorbing Media," *Phys. Rev. A* 71:063810-1-063810-10 (2005).

He et al., "Studies of Two-photon Pumped Frequency-upconverted Lasing Properties of a New Dye Material," *J. Appl. Phys.* 81(6):2529-37 (1997).

He et al., "Two-photon Absorption and Optical-limiting Properties of Novel Organic Compounds," *Opt. Lett.* 20(5):435-7 (1995).

He et al., "Two-photon Excitation and Optical Spatial-profile Reshaping via a Nonlinear Absorbing Medium," *J. Phys. Chem. A* 104:4805-10 (2000).

Herman & Gray, "Theoretical Prediction of the Stimulated Thermal Rayleigh Scattering in Liquids," *Phys. Rev. Lett.* 19(15):824-8 (1967).

Iiill et al., "Photosensitivity in Optical Fiber Waveguides: Application to Reflection Filter Fabrication," *Appl. Phys. Lett.* 32(10):647-9 (1978).

Hoffman, H.J., "Thermally Induced Phase Conjugation by Transient Real-time Holography: A Review," *J. Opt. Soc. Am. B* 3(2):253-73 (1986).

Karpov et al., "Phase Conjugation of XeCl Excimer Laser Radiation by Excitation of Various Types of Stimulated Light Scattering," *Sov. J. Quantum Electron.* 21(11):1235-8 (1991).

Khoo & Liang, "Stimulated Orientational and Thermal Scatterings and Self-starting Optical Phase Conjugation with Nematic Liquid Crystals," *Phys. Rev. E* 62(5):6722-33 (2000).

Mizrahi et al., "Physics of Photosensitive-grating Formation in Optical Fibers," *Phys. Rev. A* 43(1):433-8 (1991).

Pohl et al., "Experimental Observation of Stimulated Thermal Brillouin Scattering," *Phys. Rev. Lett.* 20(21):1141-3 (1968).

Rank et al., "Stimulated Thermal Rayleigh Scattering," *Phys. Rev. Lett.* 19(15):828-30 (1967).

Rother et al., "Time and Frequency Dependence of Stimulated Thermal Rayleigh Scattering," *Phys. Rev. Lett.* 22(18):915-8 (1969).

Robert W. Boyd, Nonlinear Optics (2d ed. 2003) (Table of Contents).

Guo & Anderson, "Undepleted Pump Regime of Hill Grating Formation in Optical Fibers," *Appl. Phys. Lett.* 60 (6):671-73 (1992).

He et al., "Observation of Stimulated Emission by Direct Three-photon Excitation," Nature 415:767-70 (2002).

He et al., "Optical Limiting, Pulse Reshaping, and Stabilization With a Nonlinear Absorptive Fiber System," Appl. Optics 36(15):3387-92 (1997).

He, "Optical Phase Conjugation: Principles, Techniques, and Applications," Prog. Quant. Elec. 26:131-91 (2002).

Guang S. He & Song H. Liu, Physics of Nonlinear Optics (1999) (Table of Contents).

He & Prasad, "Three-photon Absorbing Materials: Characterization and Applications," Proc. SPIE 5211:1-12 (2003), reprinted from Nonlinear Optical Transmission and Multiphoton Processes in Organics.

Kaiser & Maier, "Stimulated Rayleigh, Brillouin and Raman Spectroscopy," in 2 Laser Handbook 1077-150 (F.T. Arecchi & E.O. Schulz-DuBois eds., 1st ed. 1972).

Kogelnik, "Coupled Wave Theory for Thick Hologram Gratings," Bell Sys. Tech. J. 48(9):2909-47 (1969).

Mash et al., "Stimulated Scattering of Light of the Rayleigh-Line Wing," JETP Lett. 2:25-27 (1965).

Y.R. Shen, The Principles of Nonlinear Optics (1984) (Table of Contents).

0.63 cm⁻¹

0.63 cm⁻¹

0.63 cm⁻¹

BACKWARD STIMULATED RAYLEIGH-BRAGG SCATTERING DEVICES BASED ON MULTI-PHOTON ABSORBING MATERIALS AND THEIR APPLICATIONS

This application is a divisional of U.S. patent application Ser. No. 11/054,160, filed Feb. 9, 2005, which claims benefit of U.S. Provisional Patent Application Ser. No. 60/543,181, filed Feb. 10, 2004, each of which is hereby incorporated by reference in its entirety.

FIELD OF THE INVENTION

The present invention is directed to a method and system for generating backward stimulated Rayleigh-Bragg scattering.

BACKGROUND OF THE INVENTION

Stimulated scattering of intense light is one of the major subjects in the nonlinear optics. Although several types (Raman, Brillouin, Rayleigh-wing, and thermal Rayleigh) of stimulated scattering were discovered in early 1960's, the stimulated scattering related studies have remained highly active over the past several decades because of both the fundamental research interest and the potential applications (Shen, Y. R., *The Principles of Nonlinear Optics*, New York: Wiley (1984); Boyd, R. W., *Nonlinear Optics*, Second Ed., Academic, San Diego (2002); He et al., *Physics of Nonlinear Optics*, World Scientific, Singapore (2000); and Kaiser et al., "Stimulated Rayleigh, Brillouin and Raman Spectroscopy," in Arrecchi et al., eds., *Laser Handbook*, North Holland, Amsterdam (1972)). First, stimulated scattering is one of the most effective physical approaches to generate frequency-shifted coherent light emission. Second, stimulated scattering is one of the most effective technical approaches to generate optical phase-conjugate waves. In addition, the study of various stimulated scattering effects can provide a new knowledge and useful information about the interaction between nonlinear scattering media and intense coherent light radiation.

So far, for all known stimulated scattering effects, there is always a frequency shift between the stimulated scattering beam and the pump laser beam. For example, the frequency shift values are large ($10^2 \sim 10^3$ cm$^{-1}$) for most stimulated Raman scattering processes, which involve molecular vibrational transitions (Eckhardt et al., "Stimulated Raman Scattering from Organic Liquids," *Phys Rev Lett* 9:455-457 (1962)). For backward stimulated Brillouin scattering in liquid and solid media, these values are quite small ($10^{-1} \sim 1$ cm$^{-1}$), corresponding to the frequencies of opto-electrostriction induced hypersonic waves (Chiao et al., "Stimulated Brillouin Scattering and Coherent Generation of Intense Hypersonic Waves," *Phys Rev Lett* 12:592-595 (1964)). In addition, the reported frequency shift values for stimulated Rayleigh-wing scattering were around several of cm$^{-1}$ (Mash et al., "Stimulated Scattering of Light of the Rayleigh-line Wing," *JETP Lett* 2:25-27 (1965)), whereas they are more than several hundreds of cm$^{-1}$ for stimulated Kerr scattering (He et al., "Stimulated Kerr Scattering and Reorientation Work of Molecules in Liquid $CS_2$," *Phys Rev A*, 41:2687-2697 (1990)). These two types of stimulated emission have been observed only in Kerr liquids consisting of anisotropic molecules, and the frequency shift range is determined by the optical-field induced reorientation property of anisotropic liquid molecules.

There is another relatively unexplored effect named stimulated thermal Rayleigh scattering (Rank et al., "Stimulated Thermal Rayleigh Scattering," *Phys Rev Lett* 19:828-830 (1967); Cho et al., "Stimulated Thermal Rayleigh Scattering in Liquids," *Phys Rev* 175:271-274 (1968)), which was observed by Rank and Cho et al. in linear absorbing media, and was explained by Herman and Gray using a theory of one-photon absorption enhanced thermal density fluctuation (Herman et al., "Theoretical Prediction of the Stimulated Thermal Rayleigh Scattering," *Phys Rev Lett* 19:824-828 (1967); Gray et al., *Phys Rev* 181:374 (1969); and Batra et al., *Phys Rev* 185:396 (1969)). This theory could give an expression for the gain factor and predict an anti-Stokes shift that was about a half of the pump spectral line width, provided that the pump laser line width is much greater than the line width of spontaneous Rayleigh scattering for a given scattering medium. Although this precondition is fulfilled under most experimental conditions, there was a lack of experimental results to support the prediction of the anti-Stokes shift: some early reports partially supported this prediction (Rank et al., "Stimulated Thermal Rayleigh Scattering," *Phys Rev Lett* 19:828-830 (1967); Cho et al., "Stimulated Thermal Rayleigh Scattering in Liquids," *Phys Rev* 175:271-274 (1968) and Pohl et al., "Experimental Observation of Stimulated Thermal Brillouin Scattering," *Phys Rev Lett* 20:1141-1143 (1968)), whereas some others did not (Bespalov et al., "Stimulated Thermal Scattering of Short Light Pulses," *Phys Rev Lett* 24:1274-1276 (1970) and Darée et al., "Competition Between Stimulated Brillouin and Rayleigh Scattering in Absorbing Media," *Phys Rev Lett* 26:816-819 (1971)). According to the same theory (Herman et al., "Theoretical Prediction of the Stimulated Thermal Rayleigh Scattering," *Phys Rev Lett* 19:824-828 (1967)), considerable linear (one-photon) absorption is needed to enhance the thermal fluctuation of a given scattering medium; however, on the other hand, a considerable linear attenuation would be highly harmful for the initial "seed" (spontaneous) scattering signal. One needs to remember that all other types of stimulated scattering always require that the chosen gain (scattering) medium should exhibit as little linear absorption as possible to lower the threshold of stimulated scattering. For this reason the so-called stimulated thermal Rayleigh scattering (STRS) might be quite difficult to observe, and that may be the reason why only a very small number of reports on this specific subject have appeared.

The possible two-photon absorption (2PA) contribution to the stimulated thermal scattering in pure organic solvents (such as benzene) was first reported by Boissel et al., "Stimulated Scattering Induced by Two-Photon Absorption," *Journal de Physique Lettres* 39:319-322 (1978), although there was a lack of specific identification of the observed stimulated scattering. Later, the same possibility was also mentioned by Karpov et al. in another experimental study using other organic solvents (such as hexane) as the scattering media to generate backward STRS (Karpov et al., "Phase Conjugation of XeCl Excimer Laser Radiation by Excitation of Various Types of Stimulated Light Scattering," *Sov J Quantum Electro* 21:1235-1238 (1991)). However, again there was a lack of specific identification of the stimulated scattering.

The present invention overcomes these deficiencies. This newly observed stimulated scattering shows no frequency shift and, therefore, is different from most other known stimulated scattering processes.

SUMMARY OF THE INVENTION

The present invention relates to a system for generating backward stimulated Rayleigh-Bragg scattering. This system includes a source of activating radiation and a scattering cell containing a multi-photon active medium which exhibits no linear/one-photon absorption but possesses multi-photon absorption at the activating radiation's wavelength. The system also includes a focusing lens positioned to receive radiation from the source of activating radiation and focus it into the scattering cell under conditions effective to permit multi-photon absorption within the scattering cell. As a result, output radiation with backward stimulated Rayleigh Bragg scattering is produced.

Another aspect of the present invention relates to a method of generating backward stimulated Rayleigh-Bragg scattering. This method includes providing a source of activating radiation, a scattering cell containing a multi-photon active medium which exhibits no linear/one-photon absorption but possesses multi-photon absorption at the radiation's wavelength, and a first focusing lens positioned to focus the activating radiation into the scattering cell under conditions effective to permit multi-photon absorption within the scattering cell. The activating radiation is directed through the first focusing lens into the scattering cell containing the scattering medium. As a result, output radiation with backward stimulated Rayleigh Bragg scattering is produced.

The present invention provides a unique technique to produce a backward stimulated scattering radiation with no frequency shift. In doing so, it exhibits the advantage of requiring a much lower pump threshold and spectral line-width for the input pump laser light.

BRIEF DESCRIPTION OF THE DRAWINGS

FIG. 1A shows a typical gain profile, determined mathematically, where the solid-line curve indicates that the maximum gain will be reached at the position of $\Delta\omega=\omega_S-\omega_L=\Gamma_R/2$ on the anti-Stokes side of the pump wavelength where $\Delta\omega$ is the frequency shift which is equal to the Rayleigh linewidth $\acute{\Gamma}_R$ divided by $2\pi$. FIG. 1B shows the overall relative gain profiles, determined mathematically, for six different ratios of $\Gamma_L/\Gamma_R$, respectively, where $\acute{\Gamma}_R$ is the Rayleigh linewidth and $\acute{\Gamma}_L$ is the spectral line width.

FIG. 6A shows the measured interferogram formed by the backward stimulated scattering beam alone. FIG. 6B shows the interferogram of half of the input 532-nm pump beam alone. FIG. 6C shows the interferogram of the above two beams together.

6000×): a strong pump beam 1 and a very weak probe beam 2. Both beams were focused through two lenses of f=20 cm onto the center of a 1-cm path-length cuvette filled with PRL802 (0.01 M in THF). The crossing angle of these two beams was 177.5°. The energy change of pump beam 1 was controlled by rotating a polarizer prism, and a change in intensity ratio between the two beams was achieved by using a variable neutral-density filter. The gain of beam 2 could be measured either by a boxcar averager (Model 4420 from Princeton Applied Research) or by a 500-MHz two-channel digital oscilloscope (Infinium from Hewlett Packard).

FIGS. 11A-D show the Boxcar averager measured gain behaviors of a weak probe beam 2 at four different energy levels of a strong pump beam 1 under the same ratio of $I_2/I_1=1/613$. Each data point represents an average over 6 pulses of 532-nm laser with a repetition rate of 5 Hz. Based on the measured signal levels of beam 2 with and without interacting with beam 1, the relative gain of beam 2 as a function of the energy of beam 1 is easily determined. The relative intensity of beam 2 is depicted on the y-axis while time, in seconds, is depicted on the x-axis.

Figure 12:
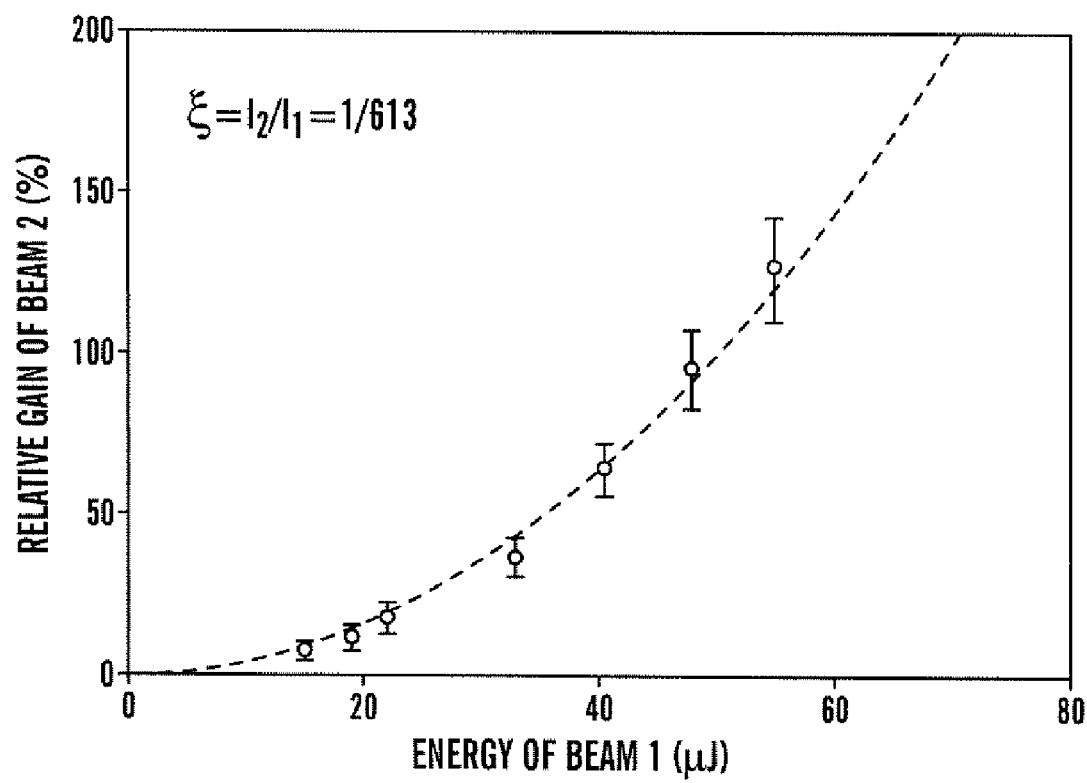
Figure 13A:
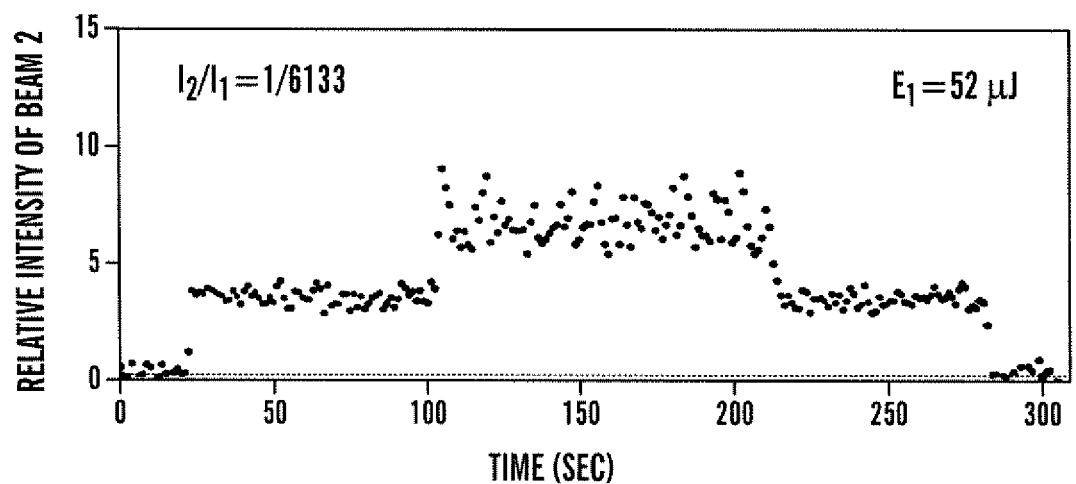
Figure 13B:
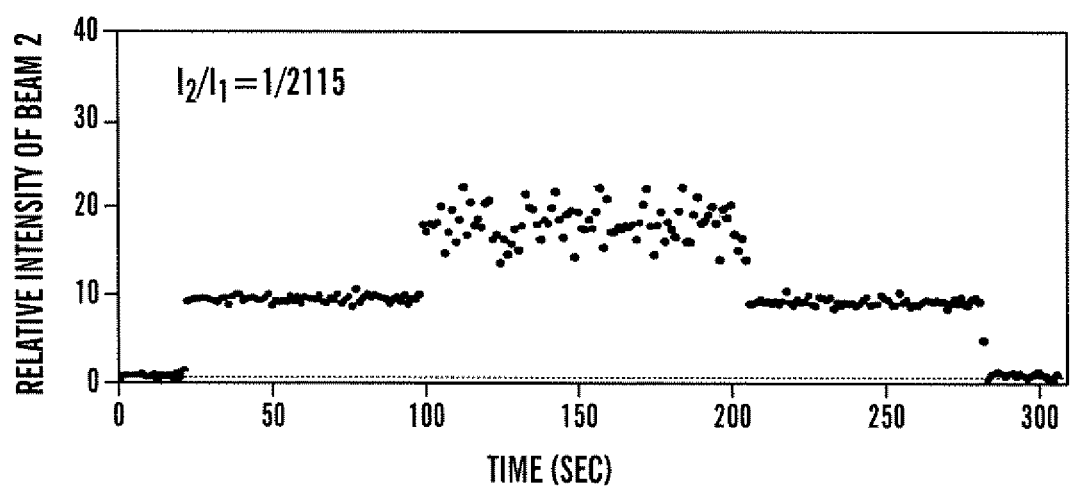
Figure 13C:
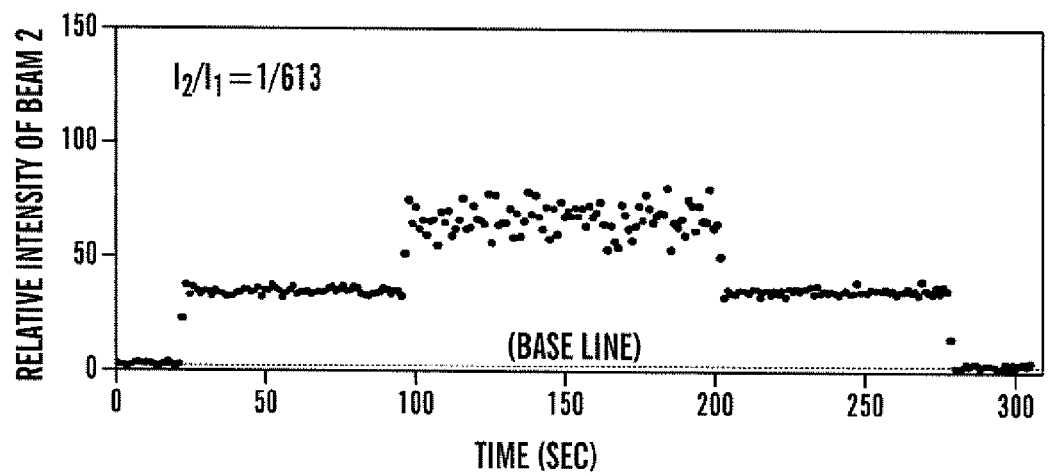
Figure 13D:
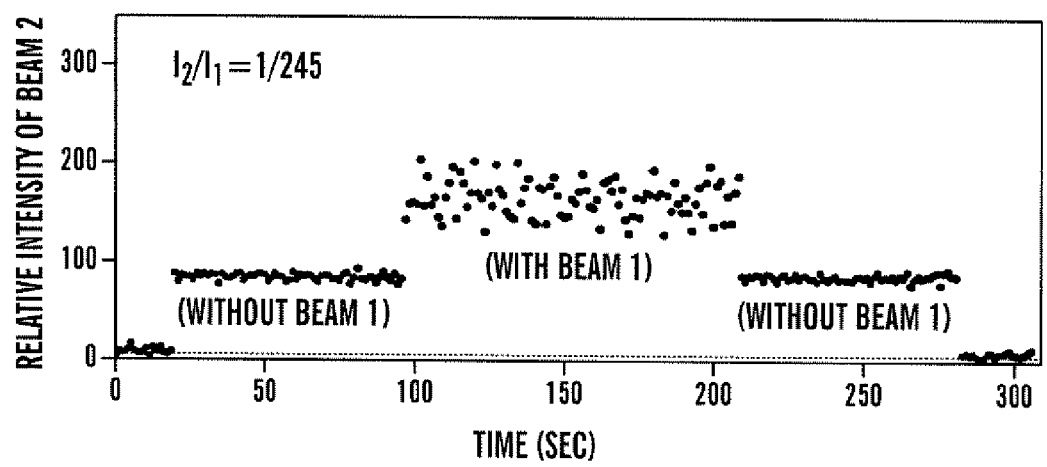

FIG. 12 shows the percent relative gain of beam 2 (y-axis) as a function of the energy of beam 1 in μJ (x-axis) under the same ratio of $I_2/I_1=1/613$. The hollow circles represent the measured G values as a function of the energy values of beam 1, while the dashed line represents the fitting curve by using a square law equation, i.e. $y=ax^2$.

FIGS. 13A-D show the boxcar-averager measured gain of beam 2 at four different ratios of $I_2/I_1$, while holding the energy level of beam 1 constant. The ratios of $I_2/I_1$ were 1/6133, 1/2115, 1/613 and 1/245, as shown in FIGS. 13A-D, respectively.

Figure 14A:
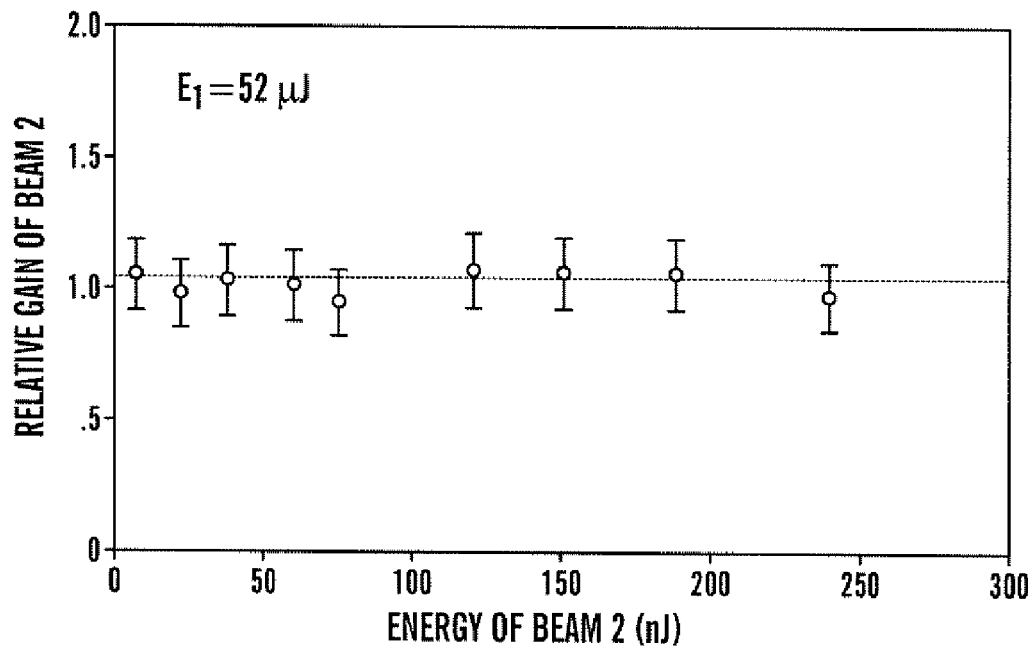
Figure 14B:
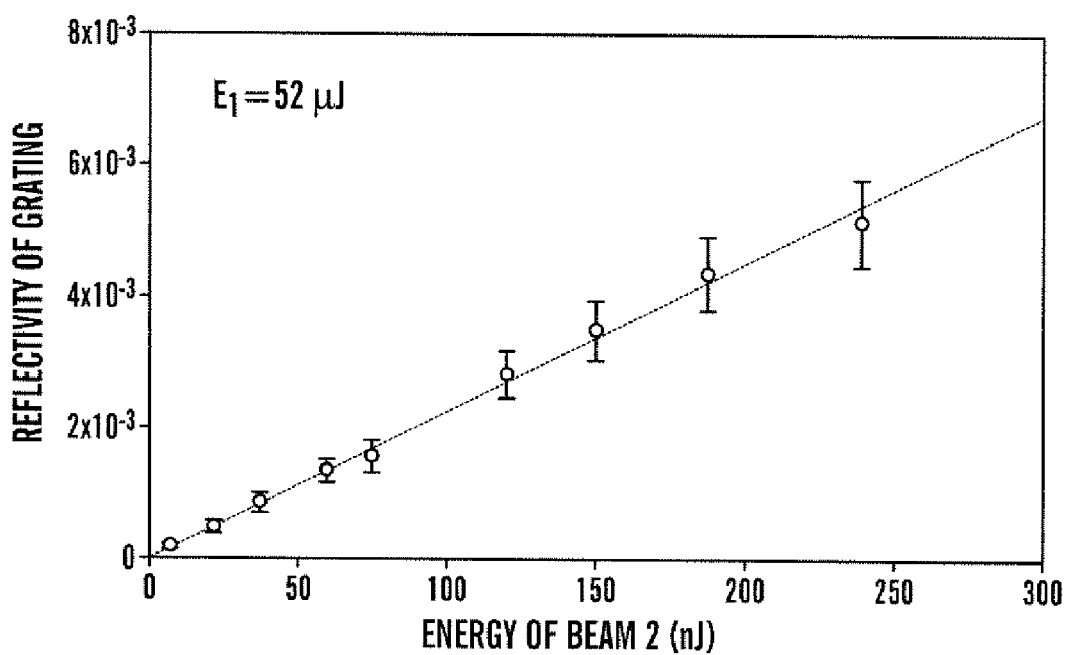

FIGS. 14 A-B show the relative gain of beam 2 and the reflectivity of the induced grating as a function of the energy of beam 2 when the energy of beam 1 is kept constant. Based on the measured data shown in FIG. 14A, a final display of the values of reflectivity R in FIG. 14B, as a function of $I_2$ under the condition of a fixed $I_1$ is shown. In this specific case, it is seen that the grating reflectivity R is proportional to the intensity (energy) of beam 2, as predicted by the equation: $R=\Delta I_1/I_1=GI_2/I_1$. Notably, an increase of the weak signal beam will further enhance the reflectivity and allow it to get still more energy from the strong pump beam. This is the positive feedback mechanism needed for generating stimulated scattering.

Figure 15A:
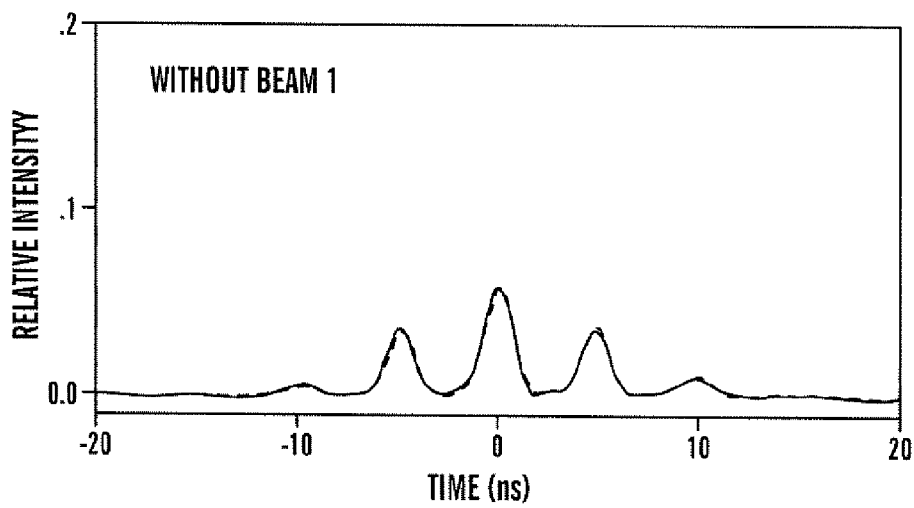
Figure 15B:
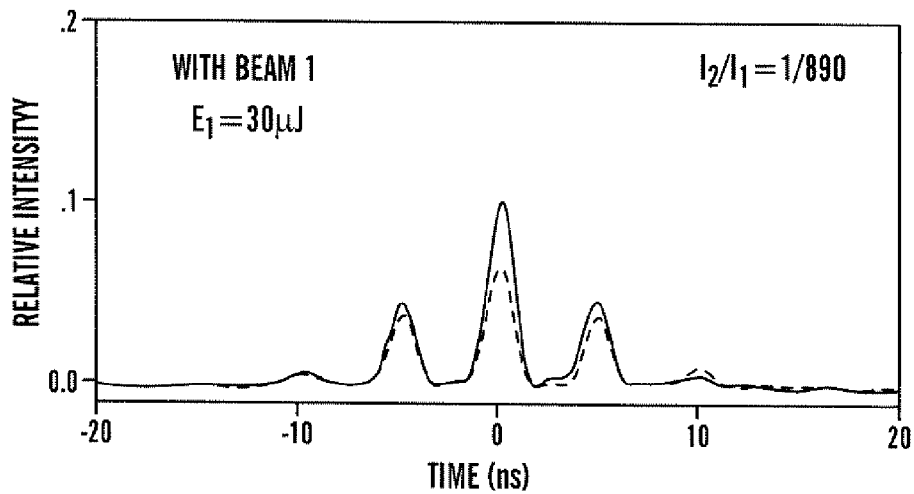
Figure 15C:
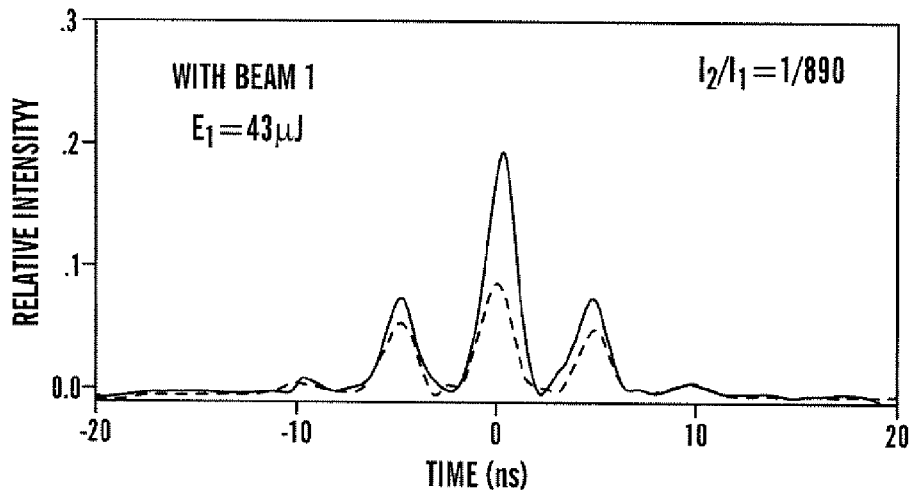

FIGS. 15A-C show temporal profiles for the input and output pulse of beam 2 at two different energy levels of beam 1. A Pockels' cell together with a BDN dye-doped polymer sheet was employed to improve the regularity of the laser pulse shape. FIGS. 15A-C show the simultaneously measured profiles of the input (dashed-line) and output (solid-line) pulses for beam 2. To obtain these results, the strong beam 1 was blocked and there was no grating inside the nonlinear medium. FIGS. 15B-C clearly show the enhancement effect of beam 2 due to grating reflection at two different energy levels of beam 1. After subtracting the dashed-line curve from the solid-line curve, the dynamic information of the gain for beam 2 as a function of time was obtained. It should be noted that the relative pulse shapes for beams 1 and 2 were identical as they are from the same source.

Figure 16A:
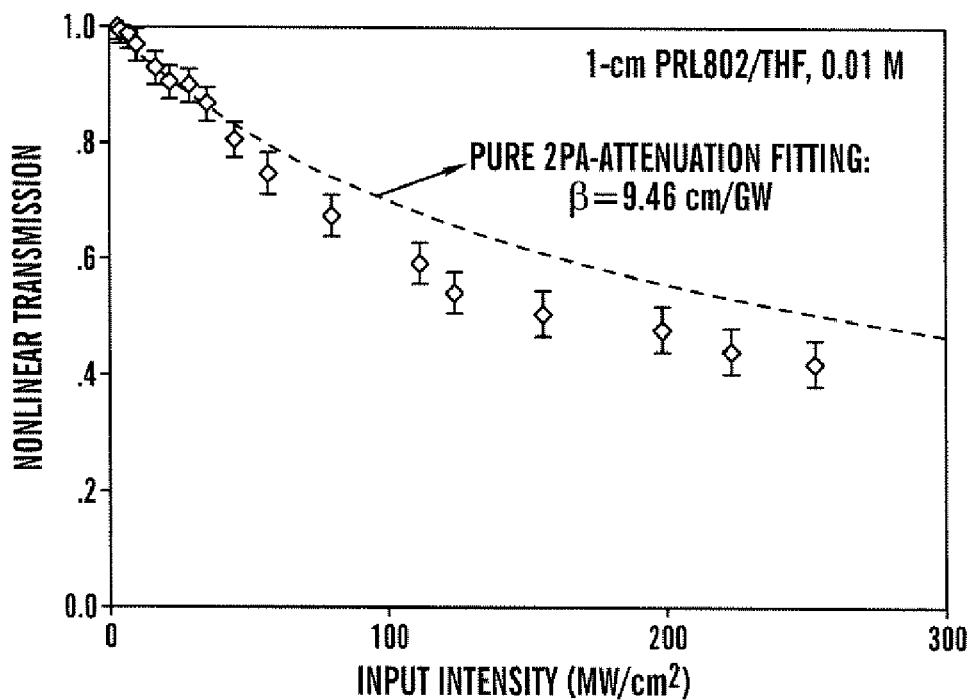
Figure 16B:
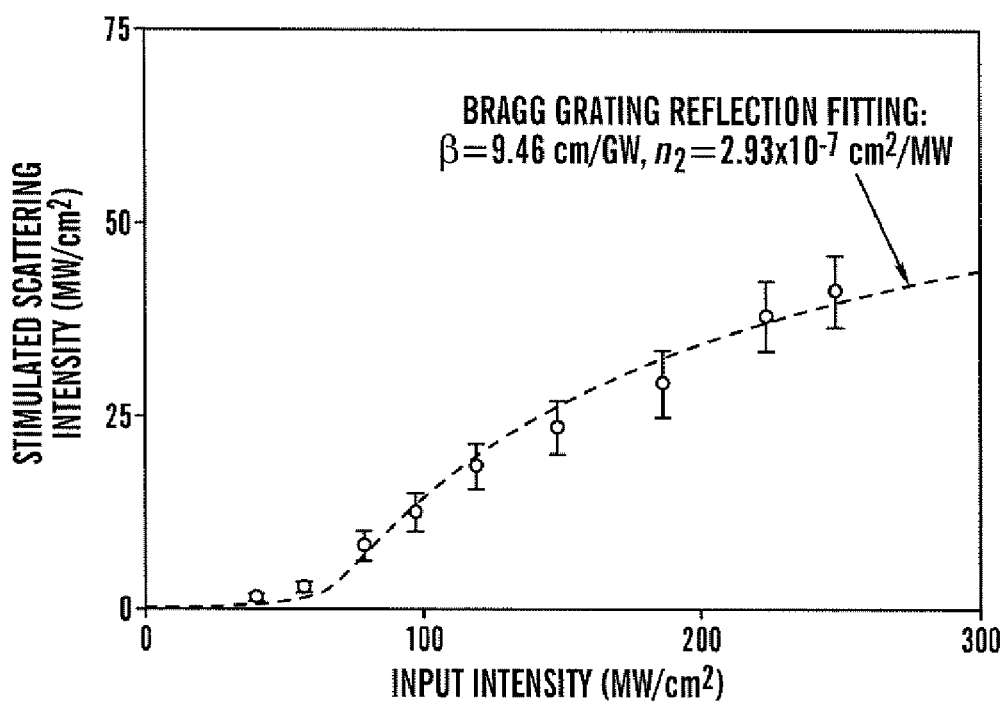

FIG. 16A shows the non-linear transmission of the pump beam (y-axis) vs. the input pump intensity in MW/cm² (x-axis). FIG. 16B shows the measured output backward stimulated scattering intensity in MW/cm² (y-axis) vs. the input intensity in MW/cm² (x-axis). The diamond points in FIG. 16A represent the measured nonlinear transmission values as a function of the pump intensity. The observed attenuation of the pump beam transmission value is due to a pure 2PA process. This occurs when the pump level is lower than the threshold of stimulated scattering. In contrast, when the pump level is higher than the threshold of stimulated scattering, both 2PA and backward stimulated scattering would be observed. The best fitting curve for the pure 2PA process is obtained by assuming a 2PA coefficient of $\beta=9.46$ cm/GW. The circle points in FIG. 16B represent the measured output intensity values of the backward stimulated scattering (y-axis) as a function of the input pump intensity (x-axis). The fitting curve represented by a dashed-line with a best-fitting parameter of $\beta=9.46$ cm/GW and $n_2=2.93\times10^{-7}$ cm²/MW. It is apparent from FIG. 16B that the theoretical output/input relationship predicted by the grating reflection model is in fairly good agreement with the measured data within experimental uncertainty.

Figure 17:
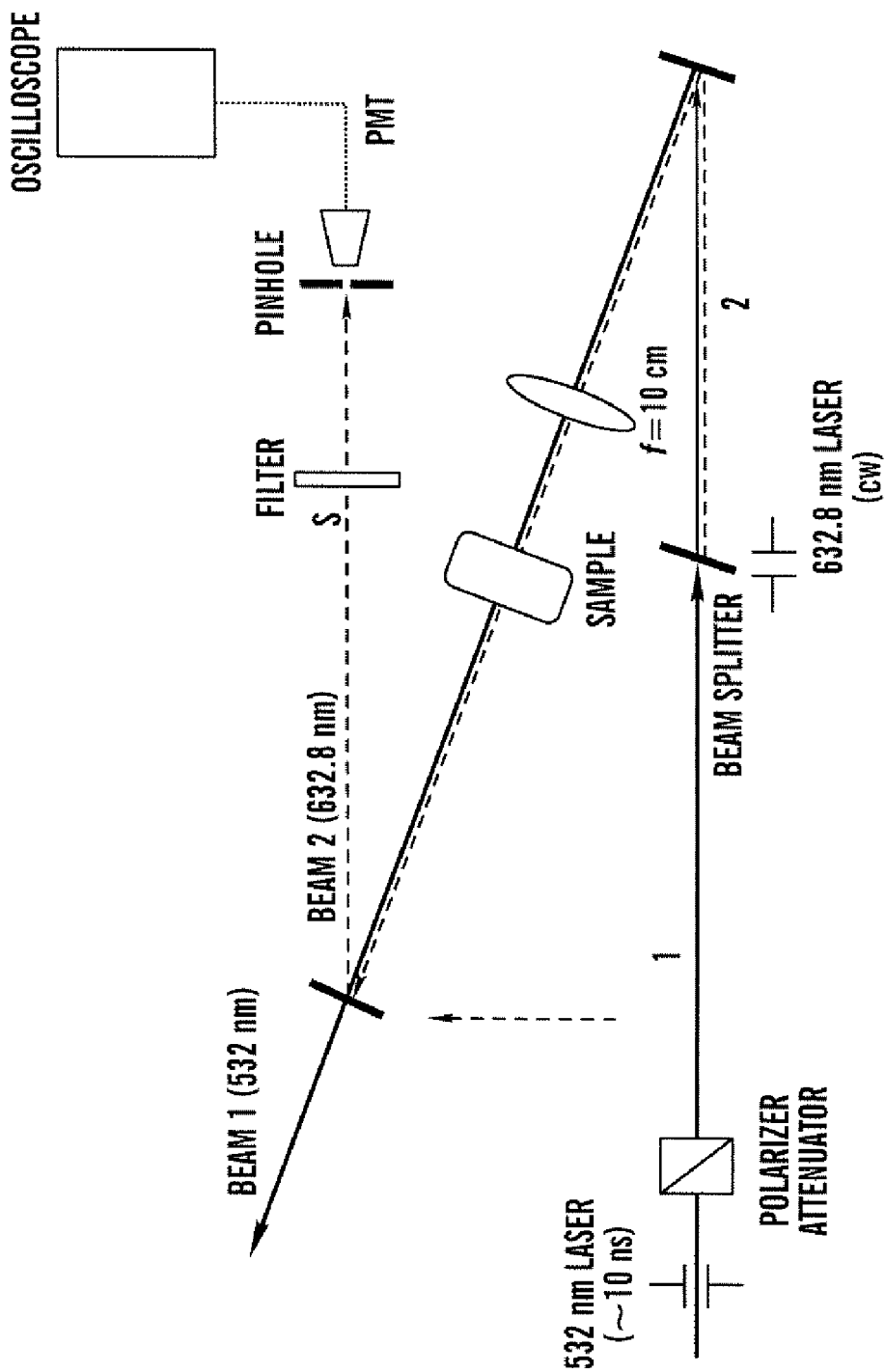

FIG. 17 shows the optical setup of two-collinearly-propagating beam coupling experiments for thermal refractive-index change measurements. A strong pulsed laser beam of 532-nm was focused through ant-10-cm lens onto the center of a 1 cm long quartz cuvette filled with a 0.01 molar solution of PRL802/THF. Concurrently, a weak beam of 632.8-nm from a cw He—Ne laser was focused via the same lens and collinearly passed through the same sample. The thermal refractive-index change was detected by utilizing an oscilloscope in conjunction with a PMT detector. The pulse energy and repetition rate of the 532-nm laser beam were ~45 μJ and 2 Hz. Any putative thermal self-defocusing effects were detected by placing a pinhole (~0.6 mm) at the outside edge of the central strong spot in the section of the diverging 632.8-nm beam after passing through the sample solution. No impulsive signal could be detected by the PMT placed behind the pinhole if there is no thermal induced refractive-index change.

Figure 18A:
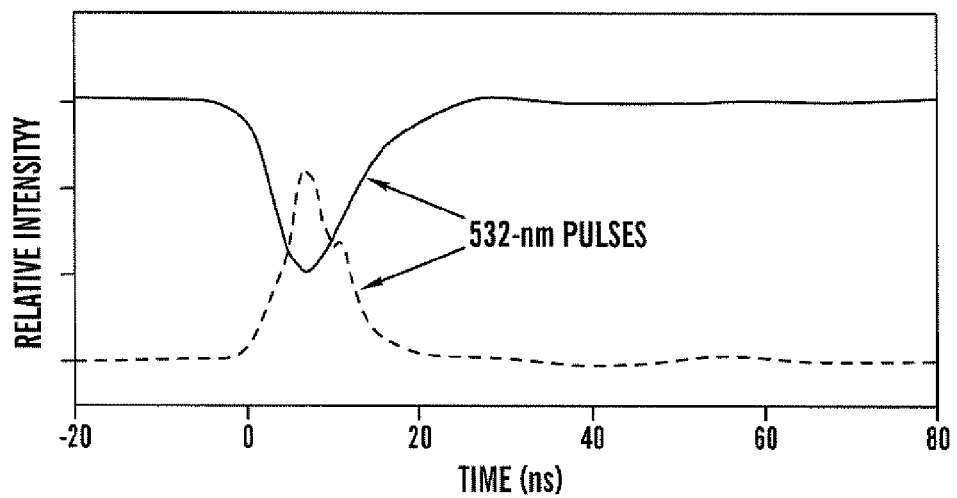
Figure 18B:
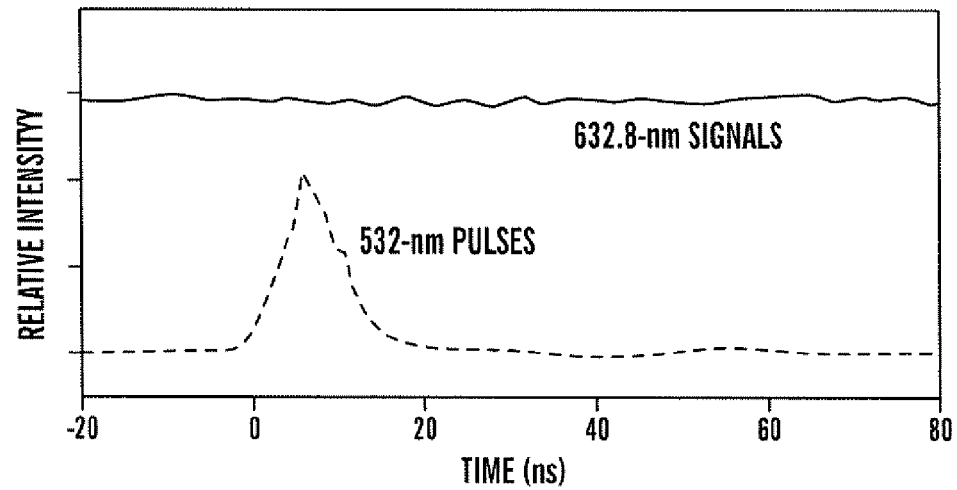
Figure 18C:
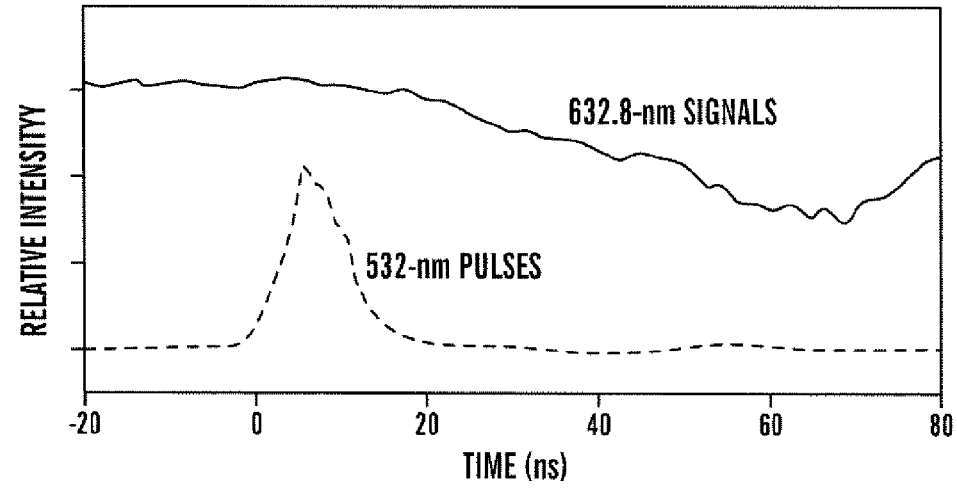

FIG. 18A shows the average waveforms of 532-nm laser pulses measured by a PMT detector and a photodiode detector. The upper-trace in FIG. 18A is the pulsed waveform of the 532-nm laser beam (actively Q-switched) measured by the PMT detector without placing the pinhole. The lower-trace is that measured by a photodiode detector, which shows nearly the same temporal response as the PMT detector. The time delay between these two channels of the oscilloscope was adjusted to ensure the same peak position, and each trace was an average of 20 laser pulses. In FIG. 18B, the upper-trace represents the recorded profile of the 632.8-nm signal while the 532-nm laser beam was blocked in front of the sample. As expected, there was no temporal change of the probe beam. When two beams passed through the sample collinearly, an obvious impulsive signal change of the 632.8-nm beam could be observed as shown in FIG. 18C. It is apparent that the thermally induced refractive-index change reaches its first maximum value about 60-70 ns later than the arrival of the 532-nm laser pulse.

FIGS. 19A-D show the waveforms of the measured 632.8-nm signals after passing through the pinhole on four different time scales. It is apparent that the thermal refractive-index change ($\Delta n_T$) is negligible during the period of 532-nm laser pulse, after 2-3 ms $\Delta n_T$ reaches its second maximum value, and the decay time of $\Delta n_T$ after its second maximum may last for longer than 10-15 ms.

DETAILED DESCRIPTION OF THE INVENTION

The present invention relates to a system for generating backward stimulated Rayleigh-Bragg scattering. This system includes a source of activating radiation and a scattering cell containing a multi-photon active medium which exhibits no linear/one-photon absorption but possesses multi-photon absorption at the activating radiation's wavelength. The system also includes a focusing lens positioned to receive radiation from the source of activating radiation and focus it into the scattering cell under conditions effective to permit multi-photon absorption within the scattering cell. As a result, output radiation with backward stimulated Rayleigh Bragg scattering is produced.

In carrying out this aspect of the present invention, the source of the activating radiation can be a laser, which may be pumped or pulsed with a higher peak power.

The multi-photon active media for this invention can be a multi-photon absorbing dye solution of various multi-photon absorbing dye compounds, a proper dye-doped solid (polymer or glass) rod, film, or waveguide, a multi-photon absorbing neat liquid dye or liquid crystal, a multi-photon absorbing crystal or semiconductor, or any other multi-photon absorbing material. The basic requirements for the active media used for this invention are (i) they should be highly transparent to the incident activating radiation when the latter is very weak, and (ii) there should be a certain non-linear (two-photon) absorption within the scattering materials when the input activating intensity is high enough. There are many materials (such as solutions of various multi-photon active dyes) which may meet the above requirements. For example, the dye compound PRL802 can be used as the scattering medium in its solution phase for backward stimulated Rayleigh-Bragg scattering demonstration. The chemical structure of PRL802 is shown below.

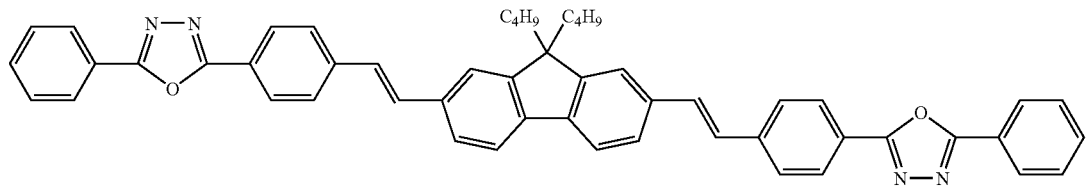

In addition, it is possible to produce backward stimulated Rayleigh-Bragg scattering by using many other multi-photon absorbing dyes (including but not limited to: AF-350, AF-50, AF-380, APSS, ASPI, PRL-701, PRL-801, AF-270, and AF-295) in their solution phase by utilizing suitable activating (pump) laser wavelengths. The chemical structures of AF-350, AF-50, AF-380, APSS, ASPI, PRL-701, PRL-801, AF-270, and AF-295 are shown below, respectively.

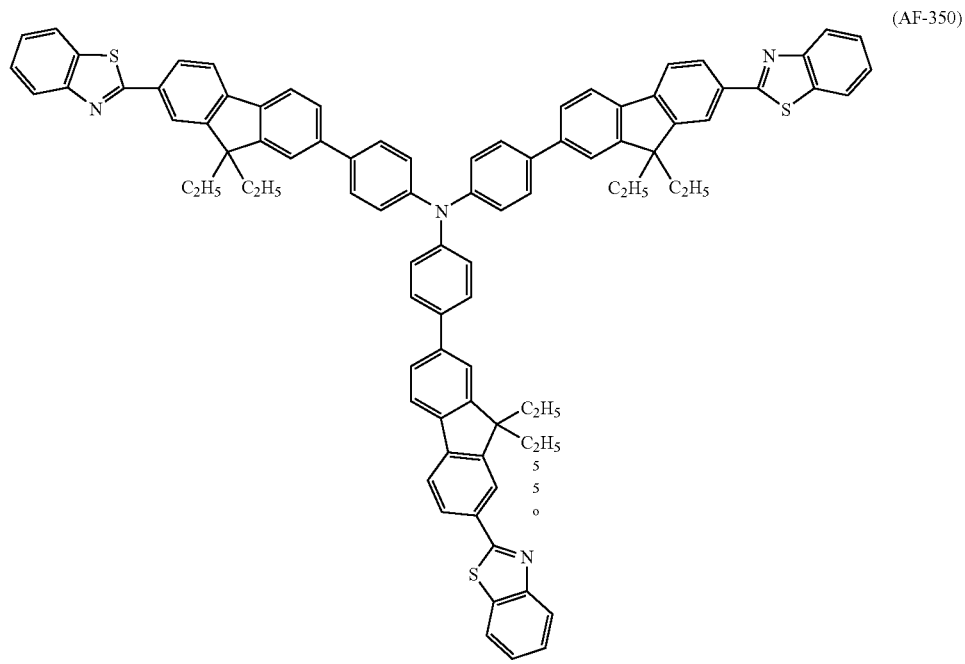

(AF-350)

-continued
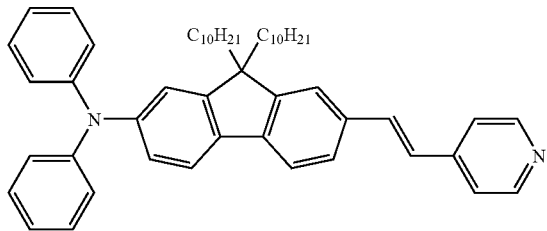
(AF-50)
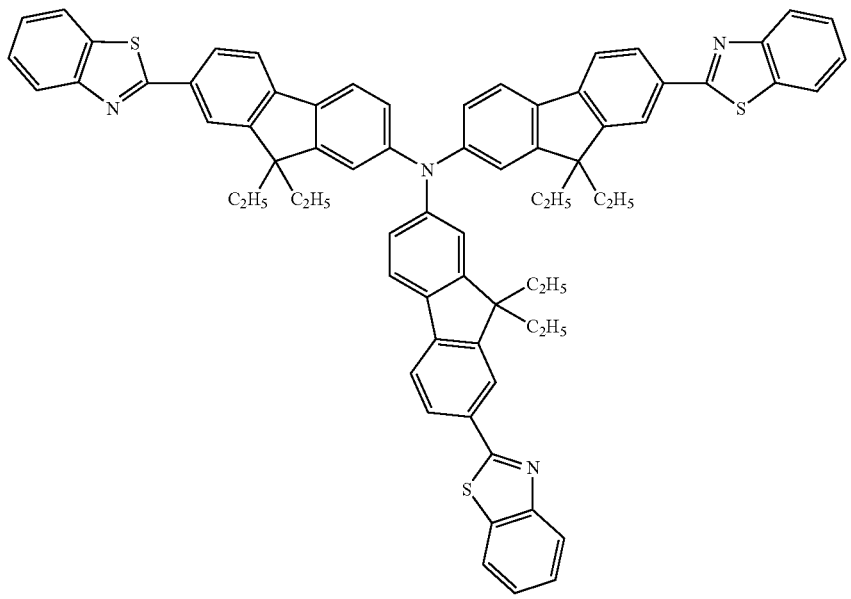
(AF-380)
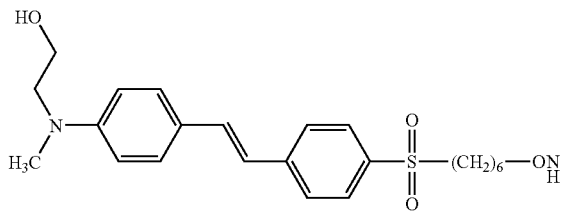
(APSS)
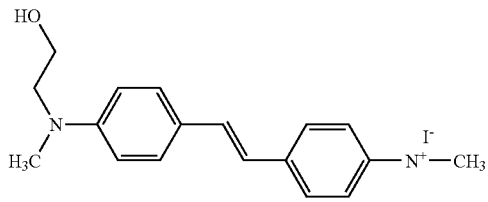
(ASPI)

-continued
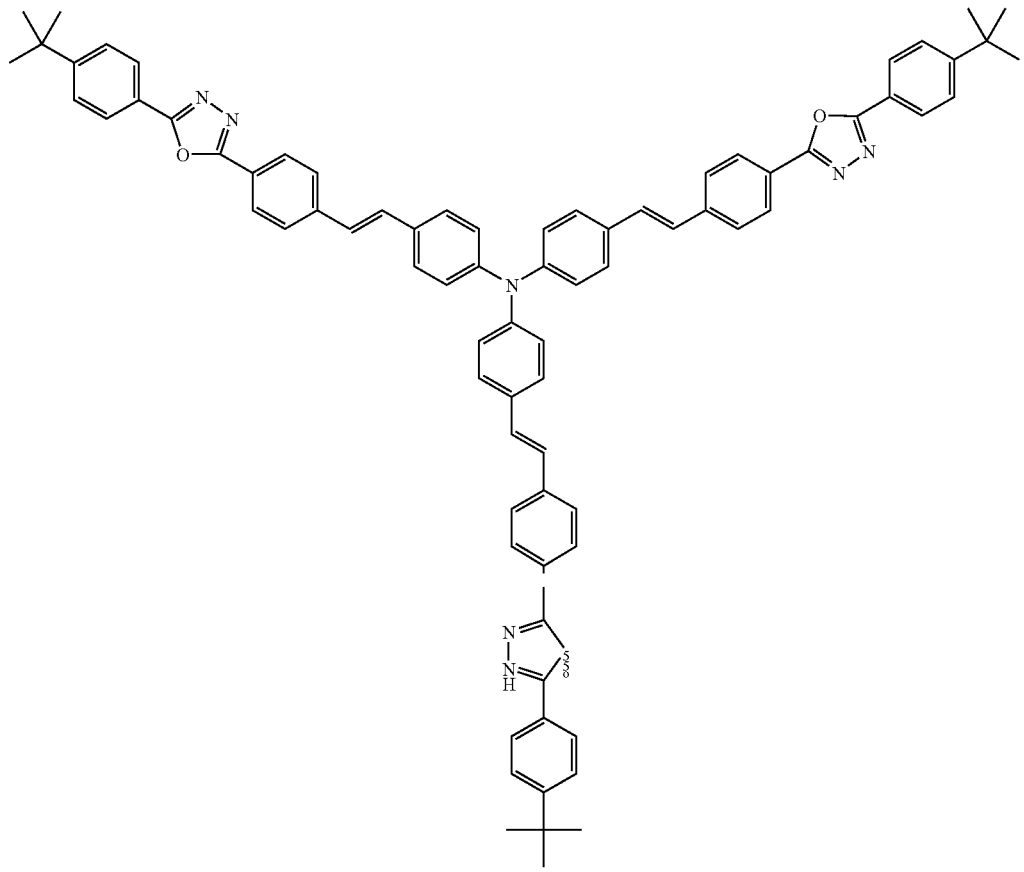
(PRL-701)
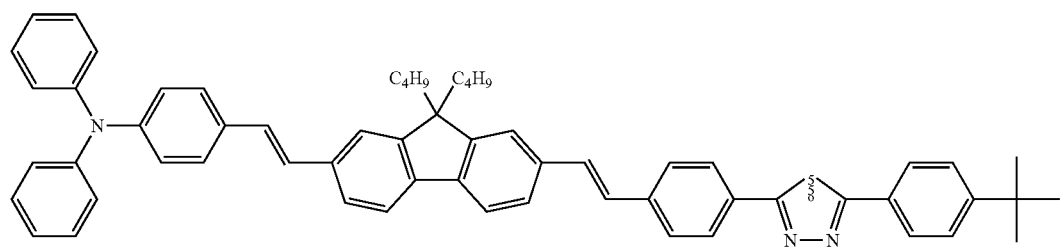
(PRL-801)
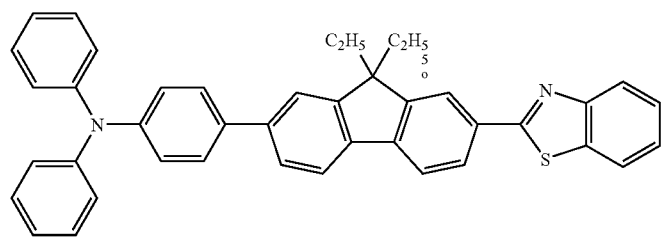
(AF-270)

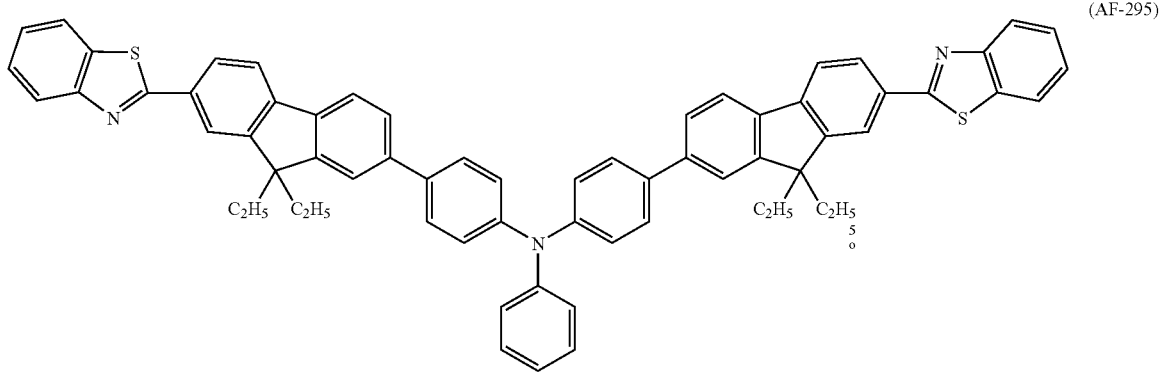

(AF-295)

The output stimulated scattering radiation that is produced may possess the same frequency as the activating radiation or a different frequency from the activating radiation.

Figure 4:
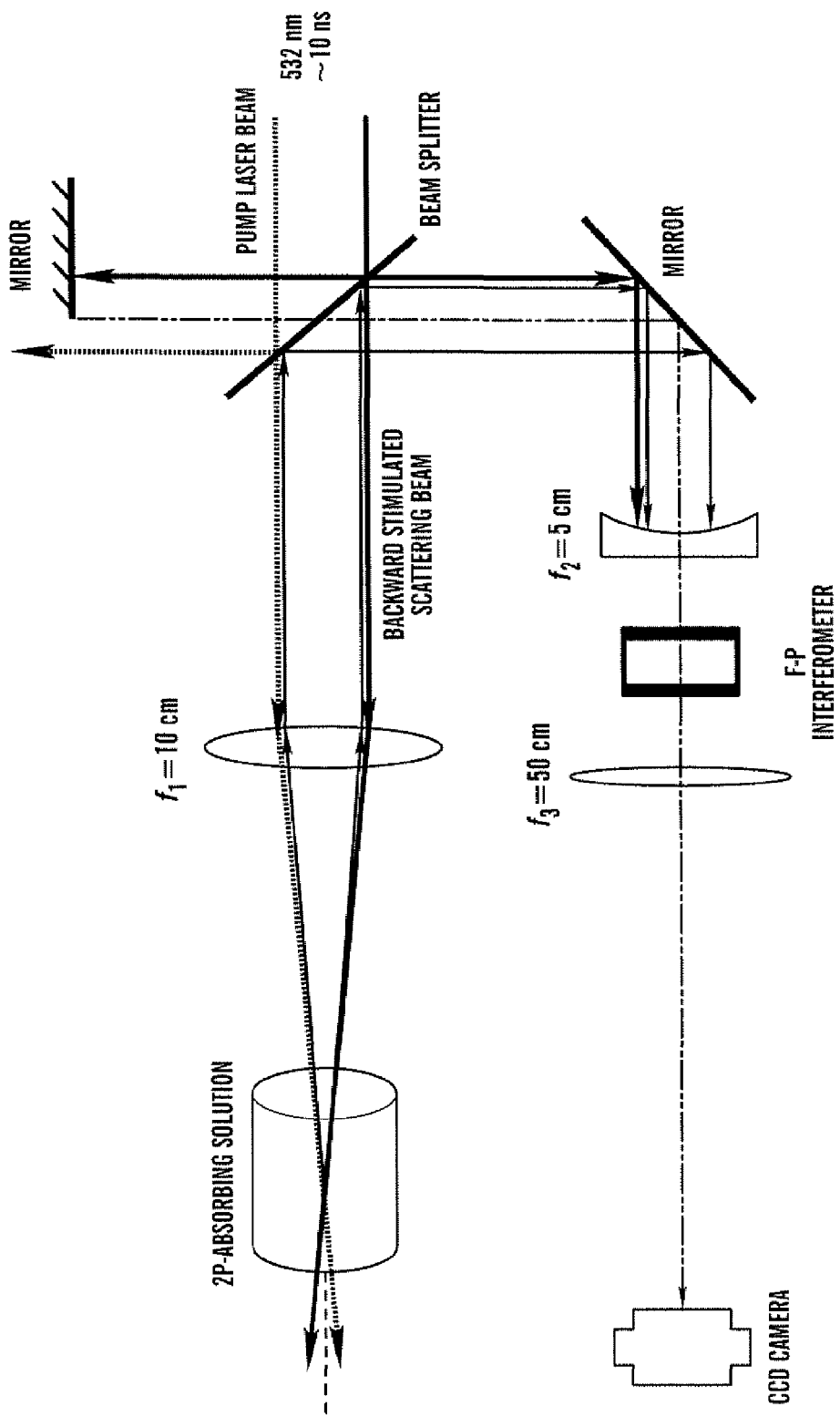
FIG. 4 shows the experimental setup for the observation of backward stimulated Rayleigh scattering from a two-photon absorbing dye solution. The input 532-nm laser beam was focused via an f=10-cm lens onto the center of a 1-cm long quartz cuvette filled with the PRL802/THF solution of 0.01 M concentration. Under these conditions, 2PA induced frequency upconversion fluorescence from the sample solution could be readily seen when the input laser intensity was $\geqq$30 MW/cm$^2$.

The laser, the scattering cell containing the scattering medium and the focusing lens may be positioned to direct the output stimulated scattering back towards the source of the activating radiation, as shown in FIG. 4.

In one embodiment, the system of the present invention also includes a beam splitter. The laser, the scattering cell, the focusing lens, and the beam splitter are positioned to direct the output stimulated scattering back in a direction opposite the activating radiation leaving the source of activating radiation until after the output radiation passes through the lens and contacts the beam splitter, as shown in FIG. 4.

Figure 10:
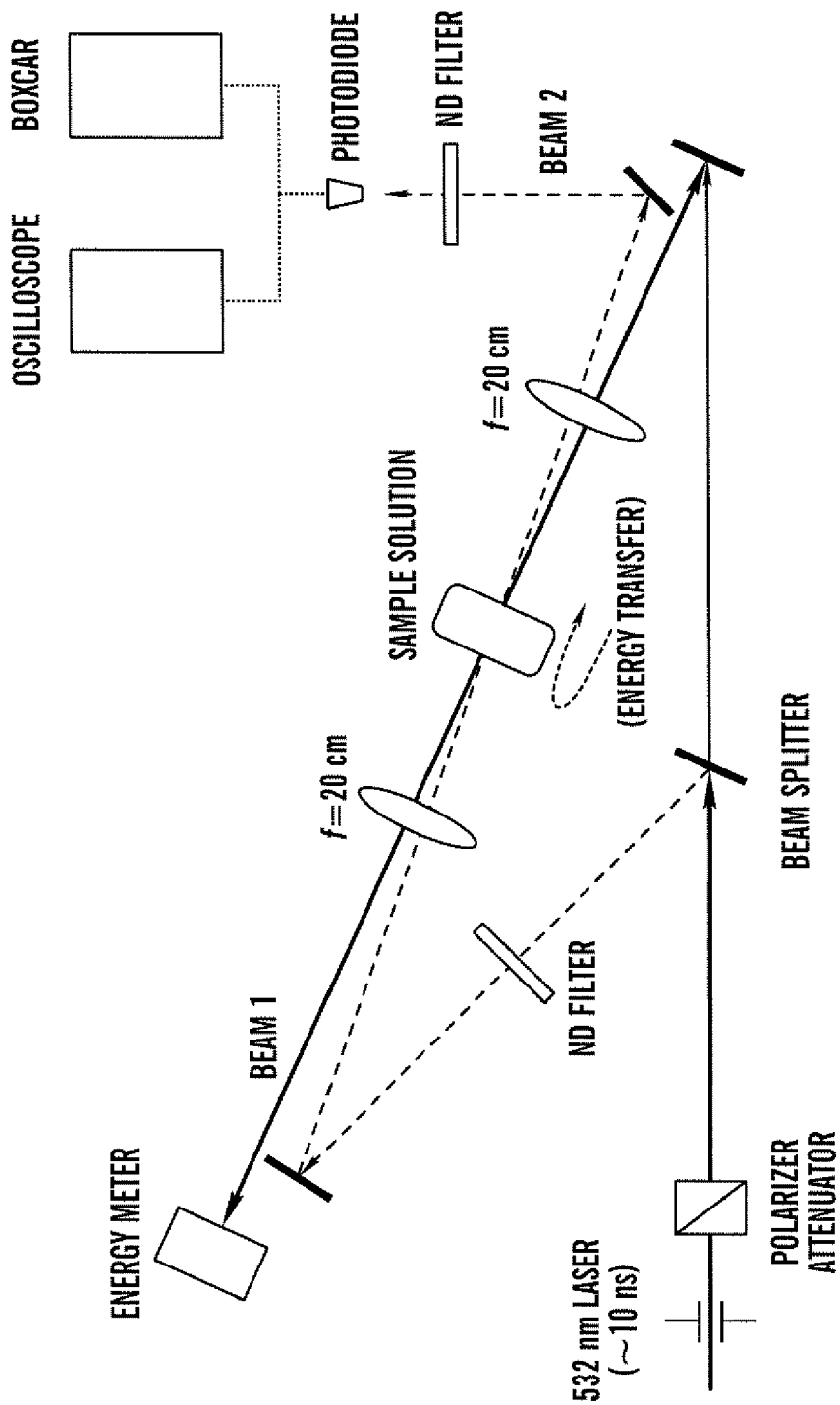
FIG. 10 shows the optical setup for a two-counter propagating induced Bragg grating experiment. A 532-nm laser output of ~0.6-cm$^{-1}$ linewidth from the Pockels' cell-switched Nd:YAG laser was split into two counter-propagating beams with a huge intensity difference (more than 600–
Figure 11A:
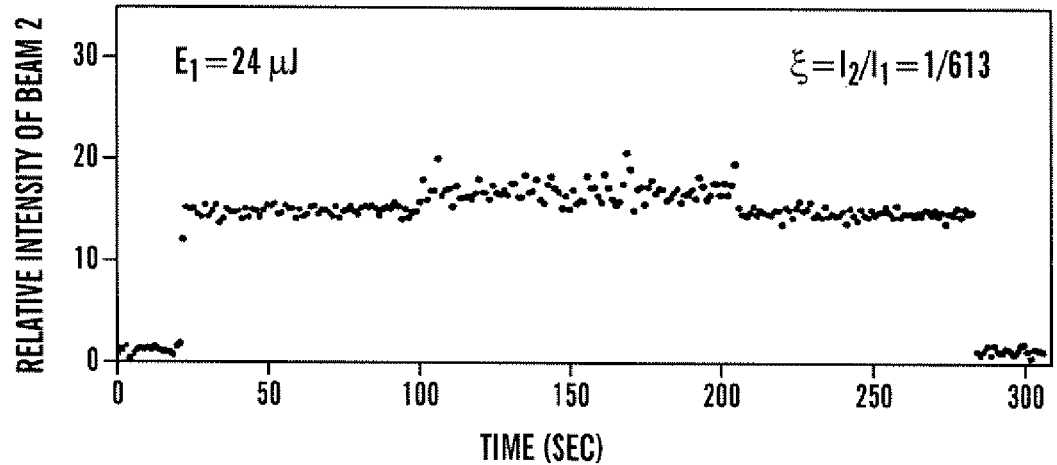
Figure 11B:
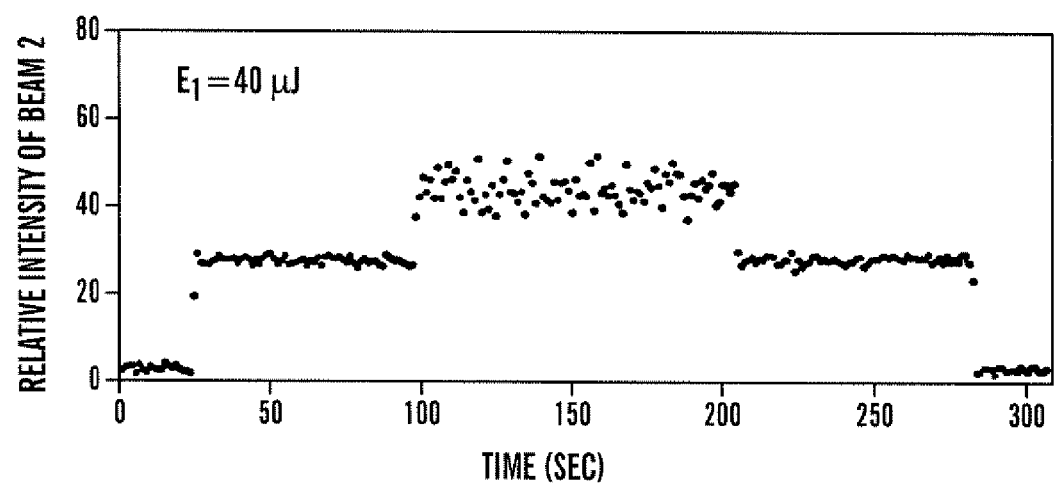
Figure 11C:
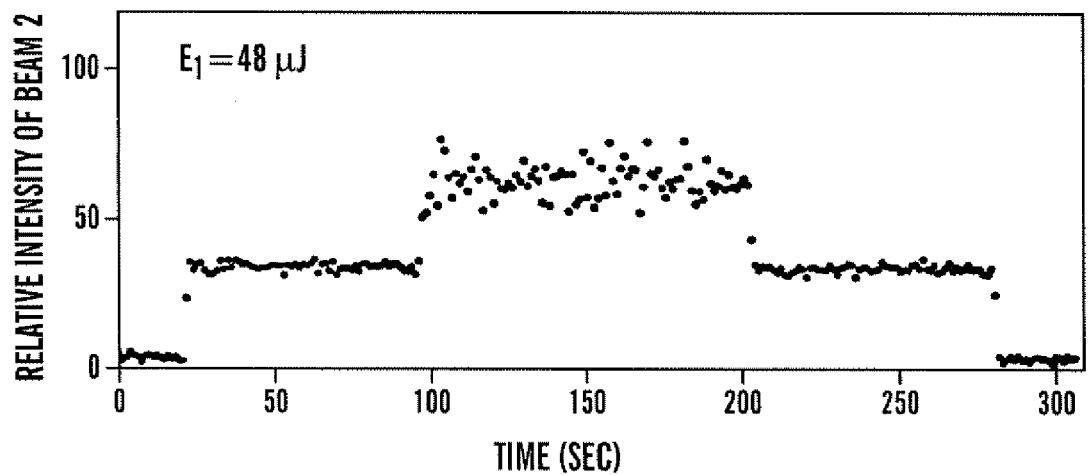
Figure 11D:
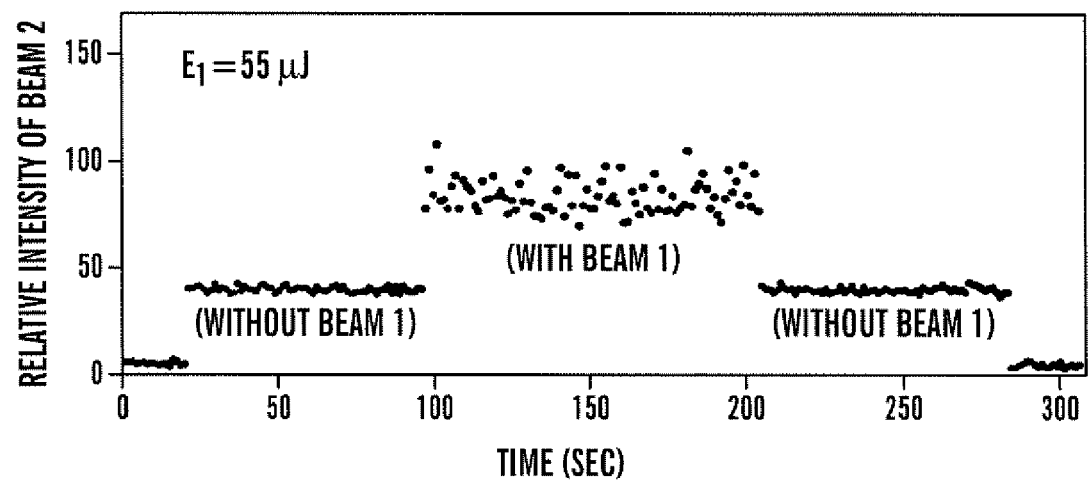

In this embodiment, as shown in FIG. 10, the system may also contain a second focusing lens, where the scattering cell is positioned between the two lenses to receive and focus the activating radiation into the scattering cell.

Another aspect of the present invention relates to a method of generating backward stimulated Rayleigh-Bragg scattering. This method includes providing a source of activating radiation, a scattering cell containing a multi-photon absorbing medium which exhibits no linear/one-photon absorption but possesses multi-photon absorption at the radiation's wavelength, and a first focusing lens positioned to focus the activating radiation into the scattering cell under conditions effective to permit multi-photon absorption within the scattering cell. The activating radiation is directed through the first focusing lens into the scattering cell containing the scattering medium. As a result, output radiation with backward stimulated Rayleigh Bragg scattering is produced. This method is carried out in substantially the same manner described above with reference to the system of the present invention.

In one embodiment, the activating radiation is utilized as an intracavity Q-switching element for Q-switched lasers. The activating radiation can also be utilized as a cavity feedback element, or mirror, for laser oscillators. In addition, the activating radiation can be used to generate frequency degenerate optical phase-conjugated waves.

Herman and Gray reported a theoretical analysis based on a linear absorption enhanced thermal temperature and density fluctuation model (Herman et al., "Theoretical Prediction of the Stimulated Thermal Rayleigh Scattering," *Phys Rev Lett* 19:824-828 (1967), which is hereby incorporated by reference in its entirety), to explain the first experimental observation of stimulated thermal Rayleigh scattering in a one-photon absorbing medium (Rank et al., "Stimulated Thermal Rayleigh Scattering," *Phys Rev Lett* 19:828-830 (1967), which is hereby incorporated by reference in its entirety). In this section, their theory is modified to consider thermal temperature and density fluctuations, which are enhanced by two-photon absorption ("2PA") instead of linear absorption. This analysis is first started with a set of equations (Herman et al., "Theoretical Prediction of the Stimulated Thermal Rayleigh Scattering," *Phys Rev Lett* 19:824-828 (1967) and Kaiser et al., "Stimulated Rayleigh, Brillouin and Raman Spectroscopy," in Arrecchi et al., eds., *Laser Handbook*, North Holland, Amsterdam (1972), which are hereby incorporated by reference in their entirety):

$$\frac{\partial^2}{\partial t^2}\bar{\rho} - \frac{c_0^2}{\gamma}\nabla^2\bar{\rho} - \frac{\eta}{\rho_0}\frac{\partial}{\partial t}\nabla^2\bar{\rho} - \frac{c_0^2\beta_T\rho_0}{\gamma}\nabla^2\bar{T} = -\frac{\gamma^e}{8\pi}\nabla^2 E^2, \quad (1)$$

$$\rho_0 C_v \frac{\partial \bar{T}}{\partial t} - \lambda_T \nabla^2 \bar{T} - \frac{C_v(\gamma-1)}{\beta_T}\frac{\partial \bar{\rho}}{\partial t} = \left(\frac{n_0 c}{4\pi}\right)^2 \beta E^4, \quad (2)$$

where $\bar{\rho}$ and $\bar{T}$ are the density and temperature fluctuations of the scattering medium, $\rho_0$ is the average or unperturbed density, $\gamma^e = \rho_0(\partial\epsilon/\partial\rho)_T$ is the electrostrictive coupling coefficient, $\gamma = C_p/C_v$ is the ratio of the specific heats at constant pressure and volume, $\lambda_T$ and $\beta_T$ are the coefficients of heat conduction and thermal expansion at constant pressure, $\eta$ the bulk viscosity coefficient, $\beta$ the two-photon absorption coefficient, $n_0$ is the refractive index, $c_0$ the velocity of sound, c the speed of light, and E is the optical electric field applied to the medium. Here, Equation (1) describes the medium density fluctuation induced by opto-electrostrictive effect, whereas Equation (2) represents the temperature and density fluctuations enhanced by 2PA with the assumption that the linear (one-photon) absorption is negligible. The overall optical field may be regarded as a superposition of two waves, i.e. the input laser field $E_L$ and the backward stimulated scattering field $E_S$:

$$E_L(z,t) = \frac{1}{2}\{E_L\exp[i(k_L z - \omega_L t)] + E_L^*\exp[-i(k_L z - \omega_L t)]\}, \quad (3)$$

$$E_S(z,t) = \frac{1}{2}\{E_S\exp[-i(k_S z + \omega_S t)] + E_S^*\exp[i(k_S z + \omega_S t)]\}; \quad (4)$$

meanwhile the fluctuated density and temperature can be written as:

$$\bar{\rho} = \frac{1}{2}\{\rho \exp[i(kz - \omega t)] + \rho^* \exp[-i(kz - \omega t)]\}, \quad (5)$$

$$\bar{T} = \frac{1}{2}\{T \exp[i(kz - \omega t)] + T^* \exp[-i(kz - \omega t)]\}, \quad (6)$$

where $\omega = \omega_L - \omega_S$ is the frequency shift and $k = k_L + k_S$ is the sum of magnitudes of wave vectors for the two waves.

Substituting Equations (3)-(6) into Equations (1) and (2) leads to a steady-state solution for $\bar{\rho}$, i.e.

$$\rho = \frac{\gamma^e}{8\pi c_0^2} \cdot \frac{i\omega - \gamma \Gamma_R/2}{i\omega - \Gamma_R/2} E_L E_S^* - \frac{(n_0 c)^2 \beta_T \beta}{(4\pi)^2 \gamma C_v} \cdot \frac{1}{i\omega - \Gamma_R/2}(|E_L|^2 + |E_S|^2)E_L E_S^*, \quad (7)$$

where $$\Gamma_R = 2\lambda_T k^2 / \rho_0 \gamma C_v \quad (8)$$

is defined as spontaneous Rayleigh scattering line width (in angular frequency units). The nonlinear polarization source can be written as:

$$P^{NL} = \frac{\gamma^e}{4\pi\rho_0} E\bar{\rho}. \quad (9)$$

The presence of a gain for backward scattering field can be shown by solving the following steady-state nonlinear coupled wave equations through a procedure similar to that given by Herman and Gray:

$$\frac{\partial E_L}{\partial z} + \frac{cn_0}{16\pi}\beta(|E_L|^2 + 2|E_S|^2)E_L = \frac{i\omega_L}{4cn}\frac{\gamma^e}{\rho_0}E_S\rho, \quad (10)$$

$$-\frac{\partial E_S}{\partial z} + \frac{cn_0}{16\pi}\beta(2|E_L|^2 + |E_S|^2)E_S = \frac{i\omega_S}{4cn}\frac{\gamma^e}{\rho_0}E_L\rho^*. \quad (11)$$

Using the relationship of $I_i = cn_0|E_1|^2/8\pi$, the above two equations can be rewritten as:

$$\frac{dI_L}{dz} = -g_e I_L I_S - g_\beta(I_L + I_S)I_L I_S - \beta I_L^2 - 2\beta I_L I_S, \quad (12)$$

$$\frac{dI_S}{dz} = -g_e I_L I_S - g_\beta(I_L + I_S)I_L I_S + \beta I_S^2 + 2\beta I_L I_S. \quad (13)$$

If it is assumed that the pump intensity is much greater than the backward stimulated scattering, $I_L \gg I_S$, these two equations can be further simplified:

$$\frac{dI_L}{dz} = -g_e I_L I_S - g_\beta I_L^2 I_S - \beta I_L^2, \quad (12')$$

$$\frac{dI_S}{dz} = -g_e I_L I_S - g_\beta I_L^2 I_S. \quad (13')$$

The above two equations describe the spatial attenuation for the forward pump light, and the gain for the backward stimulated scattering light, respectively. The gain factors for the latter can be expressed as:

$$g_e = \frac{(\gamma - 1)(\gamma^e)^2 \omega_L \Gamma_R}{4c^2 n_0^2 c_0^2 \rho_0} \frac{\omega}{\omega^2 + (\Gamma_R/2)^2}, \quad (14)$$

$$g_\beta = -\frac{2\gamma^e \omega_L \beta_T \beta}{cn_0 \rho_0 C_p} \frac{\omega}{\omega^2 + (\Gamma_R/2)^2}, \quad (15)$$

where $g_e$ is provided by the opto-electrostrictive mechanism, while $g_\beta$ is provided by the 2PA mechanism. It can be seen that the signs of these two factors are opposite for a given frequency shift $\omega$ value, namely $g_e$ insures a real gain on the Stokes side ($\omega = \omega_L - \omega_S > 0$), whereas $g_\beta$ offers a real gain on the anti-Stokes side ($\omega = \omega_L - \omega_S < 0$). From Equation (13'), one can see that under the conditions of negligible linear absorption and pump intensity depletion, a small backward scattering signal shall experience an exponential gain characterized by the following gain coefficient (in units of $cm^{-1}$):

$$G = g_e I_L^0 + g_\beta (I_L^0)^2, \quad (16)$$

where $I_L^0$ is the initial or undeleted pump intensity. If the input pump intensity is high enough, the second gain term may become dominant and, therefore, its contribution should be considered in detail.

Figure 1A:
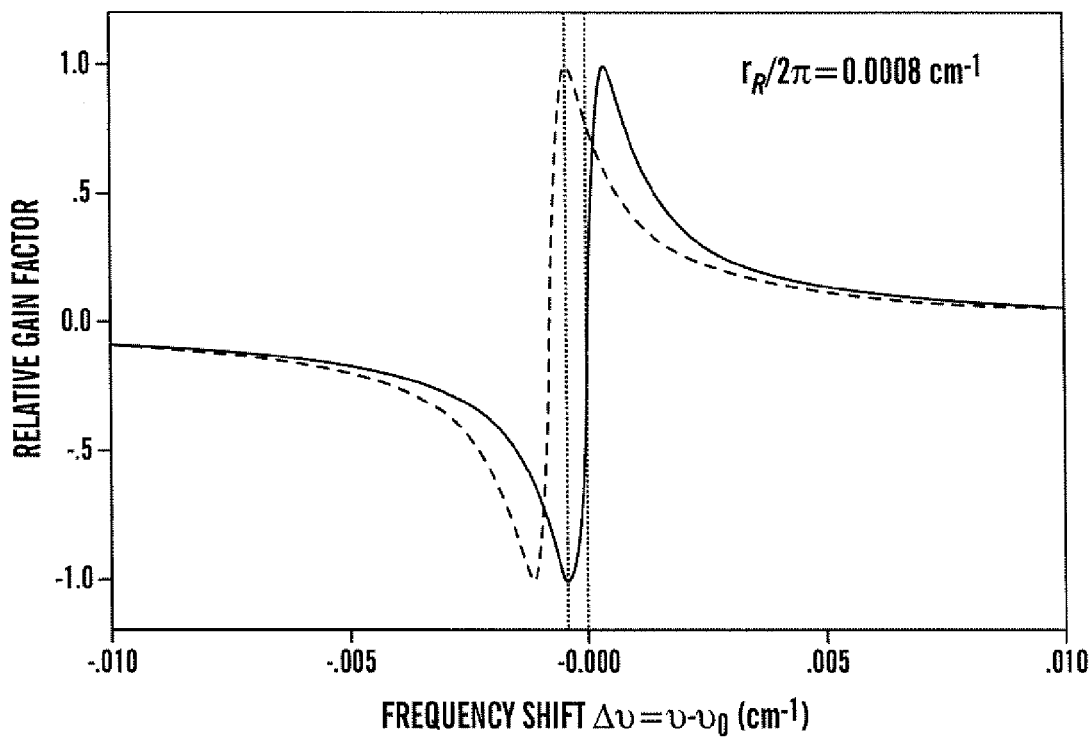
FIGS. 1A-B show the relative gain factor as a function of frequency-shift for two monochromatic pump components.

According to Equation (15), the spectral profile of the gain factor related to 2PA process contribution can be rewritten as:

$$g_\beta = g_\beta^{max} \frac{(\omega_S - \omega_L)\Gamma_R}{(\omega_S - \omega_L)^2 + (\Gamma_R/2)^2}, \quad (17)$$

where the maximum spectral gain factor is determined by:

$$g_\beta^{max} = -\frac{2\gamma^e \omega_L \beta_T}{cn_0 \rho_0 C_p} \cdot \frac{\beta}{\Gamma_R}, \quad (18)$$

which is proportional to the 2PA coefficient $\beta$ and inversely proportional to the spontaneous Rayleigh linewidth $\Gamma_R$. A typical spectral gain profile determined by Equation (17) is shown in FIG. 1A by a solid-line curve which indicates that the maximum gain will be reached at the position of $\Delta\omega = \omega_S - \omega_L = \Gamma_R/2$ on the anti-Stokes side of the pump wavelength.

Until now, it has been assumed that the input pump light is a monochromatic optical field. In reality, however, the input pump laser line width under most experimental conditions is orders of magnitude broader than the spontaneous Rayleigh line width, $\Gamma_R/2\pi$, that is around 20 MHz or $7 \times 10^{-4}$ cm$^{-1}$ for common optical media in liquid phase. For instance, under experimental conditions, the pump laser line width was ~0.08 cm$^{-1}$ or ~0.6 cm$^{-1}$, depending on what type of Q-switching element was used. In these cases of inhomogeneous broadening, the total input laser field can be treated as a superposition of a great number of different monochromatic spectral components. Each spectral component may produce its own gain curve, and the summation of a greater number of them will lead to a severe cancellation of gain for each other. For example, in FIG. 1A, the dashed-line shows the gain curve created by another input spectral component, the maximum gain position of which is just overlapping with the maximum attenuation position of the solid-line curve.

Mathematically, the overall gain profile for a given spectral distribution of pump field can be expressed as a convolution with the following form:

$$g_\beta^\Sigma(\omega_S - \omega_0) = \int_{-\infty}^{\infty} g_\beta^{max} \frac{(\omega_S - \omega)\Gamma_R}{(\omega_S - \omega)^2 + (\Gamma_R/2)^2} F(\omega - \omega_0) d\omega, \quad (19)$$

where $\omega_0$ is the central frequency of the pump laser spectrum with either a normalized Lorentzian or a Gaussian profile described by:

$$F(\omega - \omega_0) = \frac{(\Gamma_L/2)^2}{(\omega - \omega_0)^2 + (\Gamma_L/2)^2}, \quad \text{(Lorentzian)} \quad (20)$$

or $$F(\omega - \omega_0) = \exp\left[-\frac{(\omega - \omega_0)^2}{(\Gamma_L/2)^2}\right]. \quad \text{(Gaussian)} \quad (21)$$

Figure 1B:
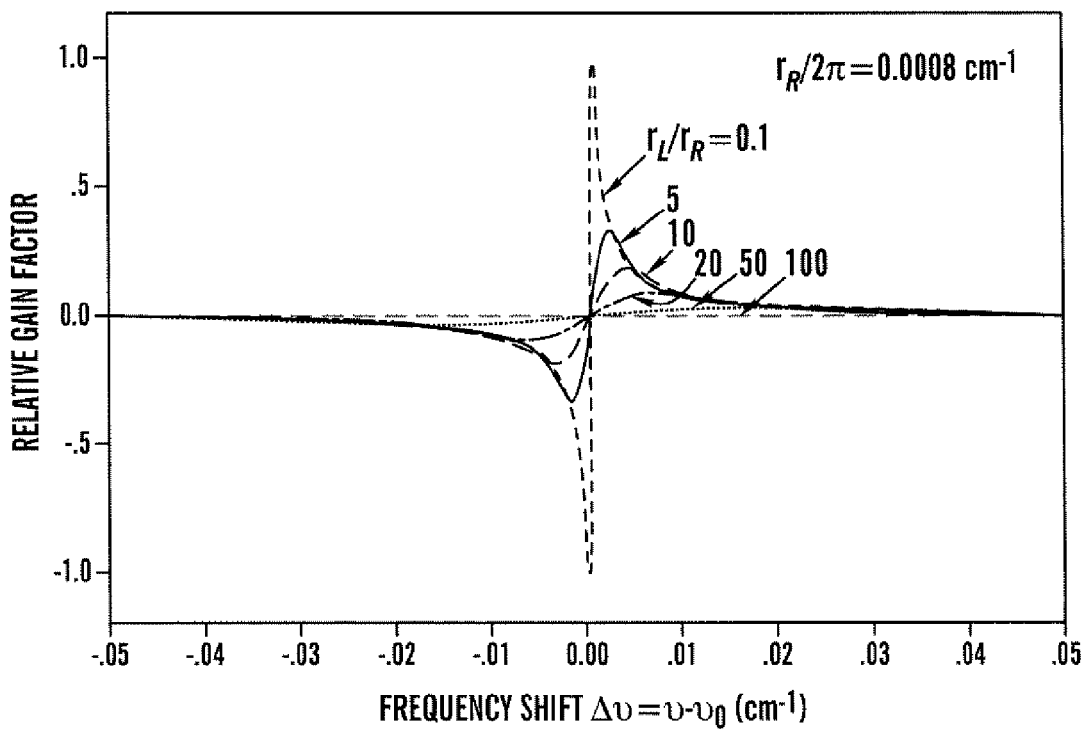

Here, $\Gamma_L$ is the pump spectral line width (on angular frequency scale). In general, Equation (19) is not analytically solvable but can be solved numerically. To do so, it is assumed that the pump laser exhibits a Gaussian spectral distribution derived from inhomogeneous broadening with a given line width of $\Gamma_L$. The overall relative gain profiles given by numerical solutions of Equation (19) are shown in FIG. 1B for six different ratios of ($\Gamma_L/\Gamma_R$), respectively. From FIG. 1B, one can see two features: (I) when $\Gamma_L/\Gamma_R \gg 1$ the overall gain factor for a broader pump laser line is significantly lower than that for a narrower pump line; (ii) the peak of overall gain is located on the anti-Stokes side and near to the ($\Gamma_L/2$) position. These two predictions can be experimentally verified by measuring the threshold dependence on the pump laser line width as well as the frequency shift of the backward stimulated scattering.

Figure 2A:
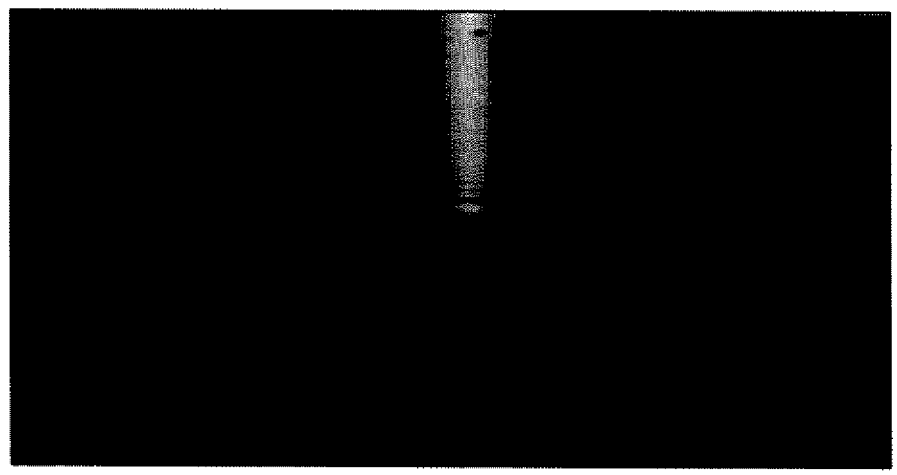
FIGS. 2A-C show the spectral photographs, respectively, of a backward stimulated scattering line, an input 532-nm pump laser line, and both stimulated scattering and pump laser lines together.
Figure 2B:
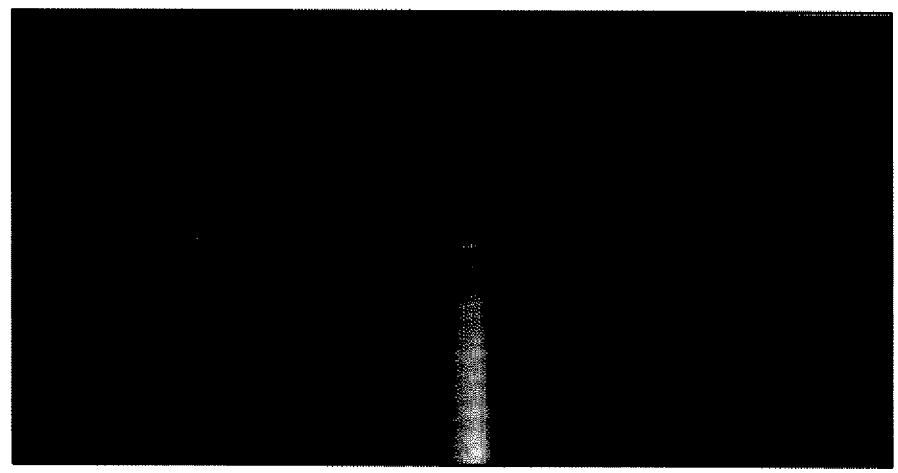
Figure 2C:
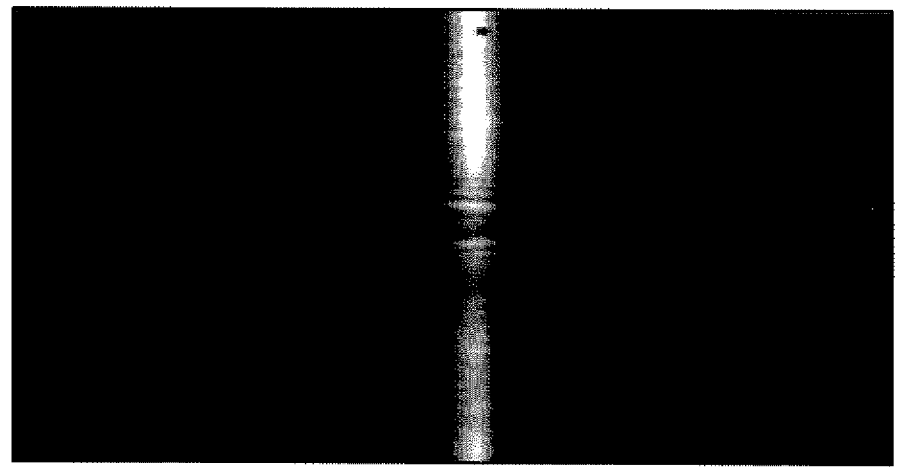

Under the experimental conditions mentioned early, the measured pump energy threshold values for observing backward stimulated scattering were ~60 μJ and ~58 μJ for the used pump laser line width of ~0.08 cm$^{-1}$ and ~0.6 cm$^{-1}$, respectively. These results show no threshold (or gain) dependence on the pump spectral line width within an experimental uncertainty of ±10%. Furthermore, the spectral structure of both the input laser beam and the backward stimulated scattering beam have been measured. For the case of a narrower (~0.08 cm$^{-1}$) pump laser line, this measurement was performed by using a 10-mm spacing Fabry-Perot interferometer, which showed no wavelength shift for the backward stimulated scattering within the spectral resolution of ~0.025 cm$^{-1}$ (He et al., "Stimulated Rayleigh-Bragg Scattering Enhanced by Two-photon Excitation", *Optics Express*, 12:5952-5961 (2004)), which is hereby incorporated by reference in its entirety). For the case of a much broader (~0.6 cm$^{-1}$) pump line width, the spectral measurement was conducted by using a 1-m double-monochromator in conjunction with a CCD camera system. The spectral resolution of the present system was determined to be ~0.11 cm$^{-1}$, which was calibrated by using an extremely narrow 532-nm laser line of width less than 0.005 cm$^{-1}$, generated from a seeded single-longitudinal-mode Nd:YAG laser (PRO-230, from Spectra-Physics). The spectral photographs for the input pump line, the output backward stimulated scattering line, and both lines together are shown in FIG. 2, respectively. Once again, there is no measured frequency shift within the spectral resolution which was much smaller than half of the pump laser line width. Based on these two (threshold and frequency-shift) measurements, it is concluded that the two predictions from the modified steady-state thermal scattering theory are not consistent with the experimental results.

The laser pulse duration used in the experiment on two-photon absorption excited stimulated Rayleigh-Bragg scattering (SRBS) is about 10 ns, whereas the line width of the spontaneously scattered light for most liquids is around δν=20 MHz (Kaiser et al., "Stimulated Rayleigh, Brillouin and Raman Spectroscopy," in Arrecchi et al., eds., *Laser Handbook*, North Holland, Amsterdam (1972), which is hereby incorporated by reference in its entirety), which is equivalent to a lifetime of τ=1/(2πδν)~8 ns. Rother et al. showed that stimulated thermal Rayleigh scattering (STRS) would be a transient phenomenon when a time constant (τ) is longer than the intense part of the laser pulse (Rother et al., *Phys Rev Lett* 22:915 (1969), which is hereby incorporated by reference in its entirety). They found theoretically and experimentally the transient light amplification in the small-signal approximation (i.e. $I_S \ll I_L$) even at $\omega = \omega_L - \omega_S = 0$ and predicted a gain proportional to τ$^2$, here $\omega_L$ and $\omega_S$ are the laser and signal frequencies, respectively. In the above analysis, to describe SRBS by using the modified Herman-Gray model, the steady-state solutions to the set of equations which describe the stimulated thermal Rayleigh scattering process was considered (Boyd, R. W., *Nonlinear Optics*, Second Ed., Academic, San Diego (2002); Kaiser et al., "Stimulated Rayleigh, Brillouin and Raman Spectroscopy," in Arrecchi et al., eds., *Laser Handbook*, North Holland, Amsterdam (1972); and Herman et al., "Theoretical Prediction of the Stimulated Thermal Rayleigh Scattering," *Phys Rev Lett* 19:824-828 (1967), which are hereby incorporated by reference in their entirety). In that case, there is no gain at ω=0 position. However, for a transient process of STRS, there could be a certain gain at ω=0, then it is possible that the effect discussed here can still be partially described using the modified Herman-Gray model with considering the transient effect.

The present invention is directed to a two-photon-excitation enhanced Bragg grating reflection model to explain the gain mechanism responsible for the backward frequency-unshifted Rayleigh scattering. It is well known that for any type of stimulated scattering the two basic requirements must be fulfilled: (i) there is an original seed signal usually from the corresponding spontaneous scattering, (ii) there is a gain (positive feedback) mechanism that ensures the further amplification of the original seed signals. Here, the backward propagating spontaneous Rayleigh scattering can be thought of as an original seed signal that may interfere with the forward propagating pump wave to form a standing wave with a spatially modulated periodic intensity distribution. This intensity modulation may further induce an intensity-dependent refractive-index change and create a stationary Bragg grating, if it is assumed that the backward scattering possesses the same frequency as the pump wave (Brewer et al., "Standing Waves in Self-Trapped Light Filaments," *Phys Rev Lett* 18:196-200 (1967), which is hereby incorporated by reference in its entirety). A Bragg grating formed in such a way will offer a nonzero reflectivity for both the strong forward pump beam and the very weak backward scattering beam. However, the absolute value of the energy reflected from the pump beam to the scattering beam will be much greater than that from backward scattering beam to the pump beam; as a net result, the backward scattering seed beam becomes stronger. Moreover, a slightly stronger backward scattering seed beam will enhance the modulation depth of the Bragg grating and, consequently, increase the reflectivity of this grating, which means more energy will transfer from the pump beam to the backward scattering beam, finally making the latter stimulated. One can see that there is a typical positive feedback mechanism provided by two counter-propagating beams forming stationary Bragg grating. Upon this physical assumption, 2PA may play a particularly important role in the following two senses. First, accompanying 2PA, there is a resonance enhanced refractive-index change that is necessary for forming an effective Bragg grating (Hill et al., *Appl Phys Lett* 32:647 (1978); Mizrahi et al., *Phys Rev A* 43:433 (1991); and Guo et al., *Appl Phys Lett* 60:67 (1992), which are hereby incorporated by reference in their entirety). Second, the 2PA leads to certain attenuation mainly on the strong pump beam not on the much weaker seed scattering beam. In contrast, for a linear absorbing medium, the linear attenuation ratio is the same for both strong pump beam and weak scattering beam, which may prohibit the latter from being finally stimulated. That can explain why the effect of frequency-unshifted stimulated Rayleigh scattering is much easier to be observed in a two-photon absorbing medium than in a linear absorbing medium.

To give a mathematical description for the suggested Bragg grating model, the intensity of the overall optical field inside the scattering medium can be written as:

$$I(z) = (I_L + I_S) + 2\sqrt{I_L I_S} \cos(4\pi n_0 z/\lambda_0). \tag{22}$$

Here, $I_L$ is the intensity of the forward pump beam, $I_S$ the intensity of backward Rayleigh scattering beam, and $n_0$ is the linear refractive index of the scattering medium at $\lambda_0$. This periodic intensity modification will produce a refractive index change with the same spatial period ($n_0 \lambda_0/2$) due to the third-order nonlinear polarization effect. The spatial modulation of the intensity-dependent refractive-index change can be expressed as:

$$\Delta n(z) = n_2 \Delta I(z) = 2n_2 \sqrt{I_L I_S} \cos(4\pi n_0 z/\lambda_0) = \delta n \cos(4\pi n_0 z/\lambda_0). \tag{23}$$

Here, $n_2$ is the nonlinear refractive-index coefficient, the value of which for a given medium is dependent on the specific mechanism of induced refractive-index change; $\delta n$ is the amplitude of the spatial refractive-index modulation. Since the scattering medium is two-photon absorbing, the nonlinear refractive-index coefficient $n_2$ can be significantly enhanced due to resonant interaction between the laser field and the nonlinear medium, as described by (He et al., *Physics of Nonlinear Optics*, World Scientific, Singapore (2000), which is hereby incorporated by reference in its entirety):

$$n_2(\omega_0) \propto d_0 \sigma_2 \frac{\omega_{2PA} - 2\omega_0}{(\omega_{2PA} - 2\omega_0)^2 + (\Gamma_{2PA}/2)^2}, \tag{24}$$

where $d_0$ is the molar concentration of the two-photon absorbing dye molecules, $\sigma_2$ is the molecular 2PA cross-section, $\omega_{2PA}$ and $\Gamma_{2PA}$ are the central frequency and bandwidth of the 2PA spectrum for a given medium, respectively. From Equation (24), it can be seen that $|n_2(\omega_0)|$ reaches its maximum values when $|\omega_{2PA} - 2\omega_0| \Rightarrow \Gamma_{2PA}/2$.

Light induced periodic refractive-index changes inside a nonlinear medium may create an induced Bragg phase grating (Brewer et al., "Standing Waves in Self-Trapped Light Filaments," *Phys Rev Lett* 18:196-200 (1967); Hill et al., *Appl Phys Lett* 32:647 (1978); Mizrahi et al., *Phys Rev A* 43:433 (1991) and Guo et al., *Appl Phys Lett* 60:67 (1992), which are hereby incorporated by reference in their entirety), which in return provides an effective reflection for both beams by the same reflectivity R. Here, the laser induced Bragg grating is essentially a thick hologram grating with a cosinoidal spatial modulation, and its reflectivity is simply given by well known Kogelnik's coupled wave theory of thick hologram gratings (Kogelnik, H., "Coupled Wave Theory for Thick Hologram Gratings," *Bell Sys Tech J* 48:2909-2947 (1969), which is hereby incorporated by reference in its entirety):

$$R = th^2(\pi \delta n L/\lambda_0). \tag{25}$$

Here, L is the thickness of the grating or the effective gain length inside the scattering medium. From Equation (23) we have:

$$\delta n = 2n_2 \sqrt{I_L I_S}. \tag{26}$$

Then, Equation (25) becomes:

$$R = th^2(2\pi n_2 \sqrt{I_L I_S} \cdot L/\lambda_0). \tag{27}$$

The threshold condition for stimulating the backward Rayleigh can be expressed as:

$$R I_L \gg I_S \{1 - \exp[-\alpha(\lambda_0) L]\}, \tag{28}$$

where $\alpha(\lambda_0)$ is the residual linear attenuation coefficient at $\lambda_0$. Under threshold conditions, it can be assumed that $R \ll 1$ and $\alpha(\lambda_0) L \ll 1$, the hyperbolic tangent function in Equation (27) can be replaced by its arguments and Equation (28) can be finally simplified as:

$$(2\pi n_2/\lambda_0)^2 L I_L^2 \geq \alpha(\lambda_0). \tag{29}$$

The physical meaning of the above condition is that for a given pump intensity level of $I_L$, the backward stimulated Rayleigh-Bragg scattering is easier to be observed in a two-photon absorbing medium possessing a larger $n_2$ value, a longer gain length L and a smaller optical attenuation.

EXAMPLES

The following examples are provided to illustrate embodiments of the present invention but are by no means intended to limit its scope.

Example 1

Linear Absorption Spectral Curves for Solutions of PRL802 Tetrahydrofuran

Figure 3:
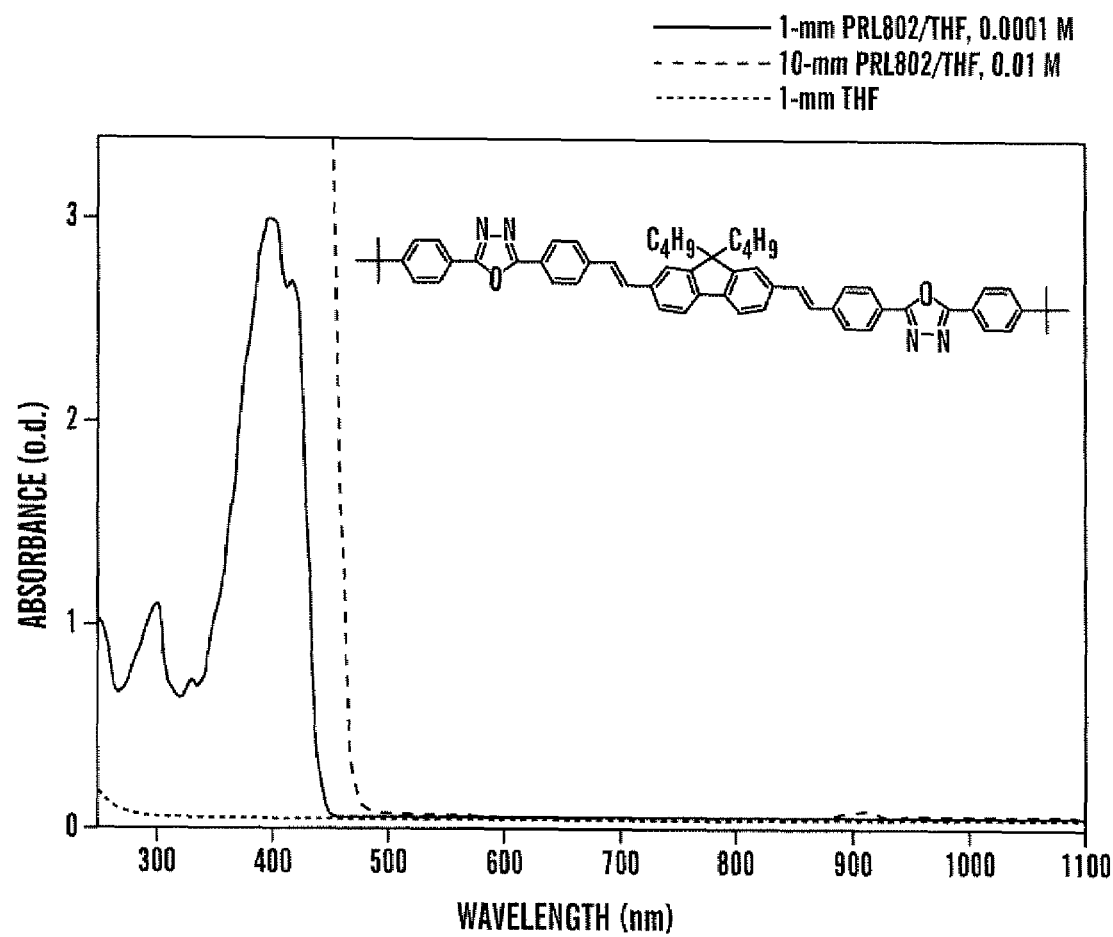
FIG. 3 shows the linear absorption spectral curves for solutions of PRL802 in THF. The chemical structure of the dye molecule, upper right corner of the figure, and the linear absorption spectra for two solutions with different concentrations and pass-lengths are shown. No linear absorption (y-axis) for PRL 802/THF in the spectral range from 520 to 875 nm (x-axis) is observed. The pump laser beam of 532-nm was provided by a Q-switched and frequency-doubled Nd:YAG laser system that utilized either an electro-optical Pockels as the active Q-switching element or a saturable BDN dye-doped acetate sheet (from Kodak) as the passive switching element. In these two cases, the output spectral line-width was ~0.8 cm$^{-1}$ for the former and 0.08 cm$^{-1}$ for the latter. The other measured parameters of the 532-nm pump laser beam were: ~10-ns pulse duration, ~3.5-mm beam size (before focusing), ~1-mrad divergence angle, and 5-Hz repetition size.

The scattering medium of the present invention comprises a two-photon absorbing dye solution: PRL802 in tetrahydrofuran (THF of spectroscopic grade). This dye is one of a series of novel two-photon absorbing chromosphores synthesized for 2PA-based optical limiting and frequency-upconversion lasing purposes (He et al., "Two-Photon Absorption and Optical-Limiting Properties of Novel Organic Compounds," *Opt Lett* 20:435-437 (1995); He et al., "Observation of Stimulated Emission by Direct Three-Photon Excitation," *Nature* 415:767-770 (2002); and He et al., "Degenerate Two-Photon- Absorption Spectral Studies of Highly Two-Photon Active Organic Chromophores," *J Chem Phys* 120:5275-5284 (2004), which are hereby incorporated by reference in their entirety). The chemical structure of the dye molecule and the linear absorption spectra for two solutions of PRL802/THF with different concentrations and pass-lengths are shown in FIG. 3. It is apparent that there is no linear absorption for PRL802/THF in the spectral range from 520 to 875 nm. This scattering medium is used in each subsequent 2PA experiment.

Example 2

Experimental Setup and Results of Stimulated Rayleigh Scattering Experiments

Figure 5A:
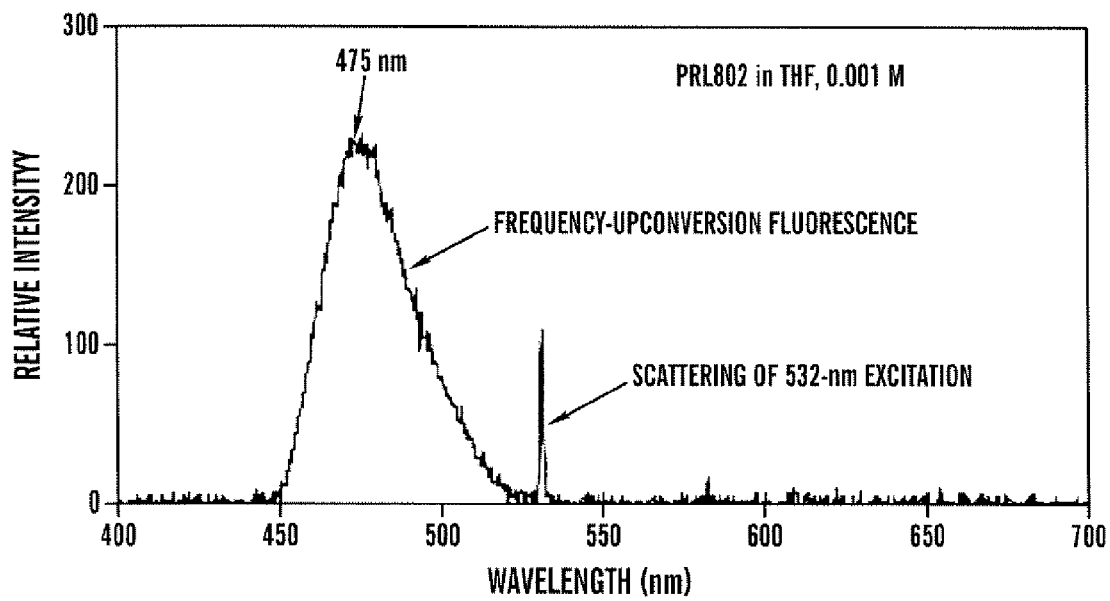
FIGS. 5A-B show the two-photon excited fluorescence spectrum and the decay of two-photon excited fluorescence emission from a solution of PRL802 THF. The peak fluorescence emission wavelength was located at ~475 nm (FIG. 5A). The fluorescence lifetime was measured to be t=1.3 ns (FIG. 5B), by using a high-speed streak camera (C5680-22 from Hamamatsu) in conjunction with a 150-fs and 79-nm laser excitation source, i.e., a Ti-sapphire oscillator/amplifier system (CPA-2010, from Clark-MXR).
Figure 5B:
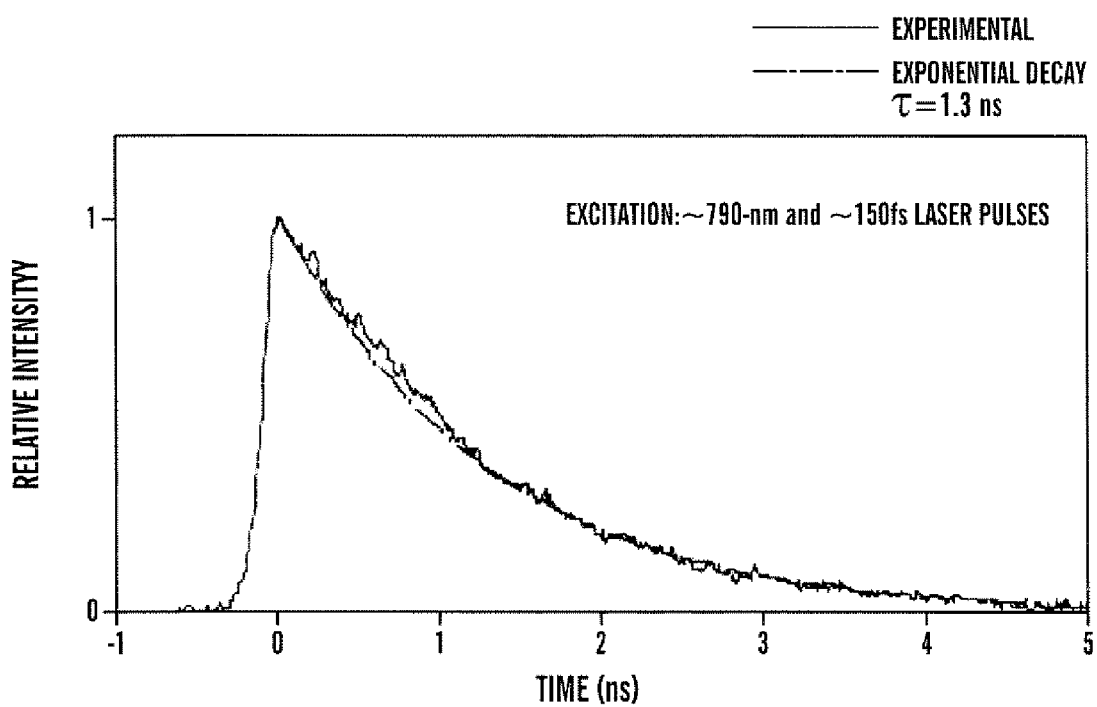

The optical setup for observing backward Rayleigh scattering in the two-photon absorbing dye-solution PRL802/THF is schematically shown in FIG. 4. The input 532-nm laser beam was focused via ant-10-cm lens onto the center of a 1-cm long quartz cuvette filled with a 0.01 M solution of PRL802/THF. Under these conditions, 2PA induced frequency upconversion fluorescence from the sample solution could be readily seen when the input laser intensity was ≧30 MW/cm$^2$. FIGS. 5A-B show the two-photon excited fluorescence spectrum and the decay of two-photon excited fluorescence emission from a solution of PRL802 THF. The peak fluorescence emission wavelength was located at ~475 nm (FIG. 5A).

Figure 6C:
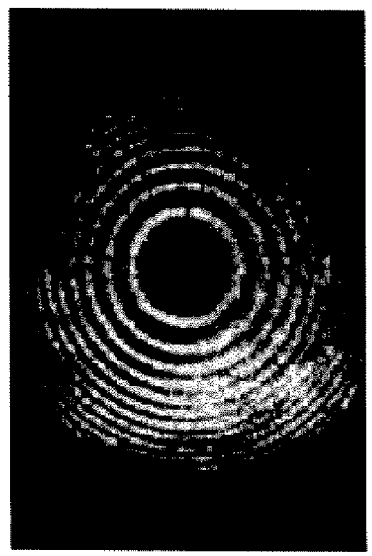
FIGS. 6A-C show Fabry-Perot interferograms. A Fabry-Perot interferometer of 1-cm spacing was used in conjunction with an f=50-cm lens and a CCD camera operating in a single-shot mode. The combined spectral recording system exhibited a spectral resolution of 0.025 cm$^{-1}$, which was calibrated by using an ultra-narrow-line ($\leqq$0.005 cm$^{-1}$) 532-nm laser beam from an injection seeded Nd:YAG laser system (PRO230-10, from Spectra-Physics).
Figure 6B:
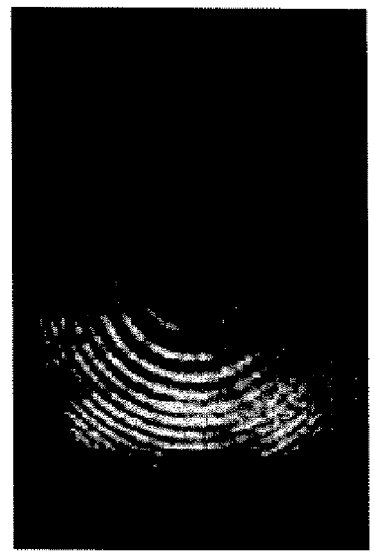
Figure 6A:

In order to identify the spectral property of the observed stimulated scattering, a Fabry-Perot interferometer of 1-cm spacing was used in conjunction with an f=50-cm lens and a CCD camera operating in single-shot mode (FIGS. 6A-C). The measured interferogram formed by the backward stimulated scattering beam alone, half of the input 532-nm pump beam alone, and these two beams together are shown in FIGS. 6A-C, respectively. It is apparent that both the backward stimulated scattering beam and the input pump beam have nearly the same spectral width of ~0.08 cm$^{-1}$ (FIGS. 6A-B). Also apparent is the absence of a frequency shift between the pump laser and the backward stimulated scattering within the spectral resolution of ~0.025 cm$^{-1}$ (FIG. 6C). This is in contrast to an anti-Stokes shift of D/2~0.04 cm$^{-1}$ predicted by the early theory of one-photon excited stimulated thermal Rayleigh scattering (Herman et al., "Theoretical Prediction of the Stimulated Thermal Rayleigh Scattering in Liquids," *Phys Rev Lett* 19:824-828 (1967), which is hereby incorporated by reference in its entirety).

It was found that the pump energy threshold value for observing backward stimulated Rayleigh scattering will get higher when the concentration of the dye solution is reduced. In an extreme situation of using a 1-cm long pure solvent (THF of spectroscopic grade) as the scattering medium, no backward stimulated scattering was observed until the energy value of the pump laser with ~0.08 cm$^{-1}$ line-width was increased up to ~150 µJ (or ~100 MW/cm$^2$). When the pump level was higher than that threshold value backward stimulated Billouin scattering (SBS)) from the pure solvent sample was observed.

Figure 7:
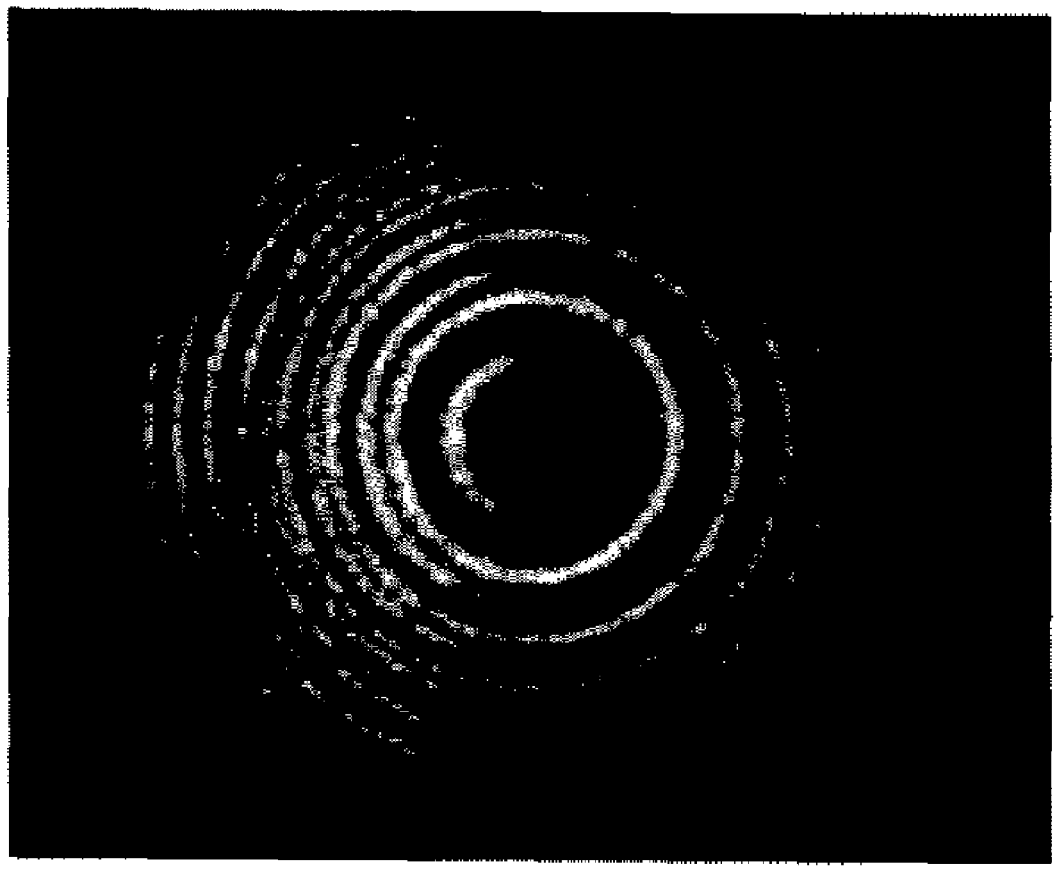
FIG. 7 shows a Fabry-Perot interferogram formed by both the backward stimulated Brillouin scattering beam from a 1-cm long THF solvent and the input pump laser beam. A Fabry-Perot interferometer of 1-cm spacing was used in conjunction with an f=50-cm lens and a CCD camera operating in a single-shot mode. The combined spectral recording system exhibited a spectral resolution of 0.025 cm$^{-1}$, which was calibrated by using an ultra-narrow-line ($\leqq$0.005 cm$^{-1}$) 532-nm laser beam from an injection seeded Nd:YAG laser system (PRO230-10, from Spectra-Physics). The interferogram formed by both the backward SDS beam (whole rings) and the input pump laser beam (half-rings) was obtained using the above set-up with a free spectral range of 0.5 cm$^1$.

An interferogram formed by both the backward SBS beam and the input pump laser beam is shown in FIG. 7. The Fabry-Perot setup with a free spectral range of 0.5 cm$^{-1}$ was employed. Based on this interferogram, the Brillouin frequency-shift value is determined to be ~0.2 cm$^{-1}$ for THF. Furthermore, it was determined that when a broad-line (~0.8 cm$^{-1}$) pump beam was used, the pump energy threshold for the observed backward stimulated scattering from a 1-cm THF sample was much higher, i.e., ~225 µJ (or ~150 MW/cm$^2$). These findings indicate that the pump threshold value for frequency-unshifted stimulated Rayleigh scattering in a two-photon absorbing dye solution is much lower than that for SBS in the pure transparent solvent.

Figure 8A:
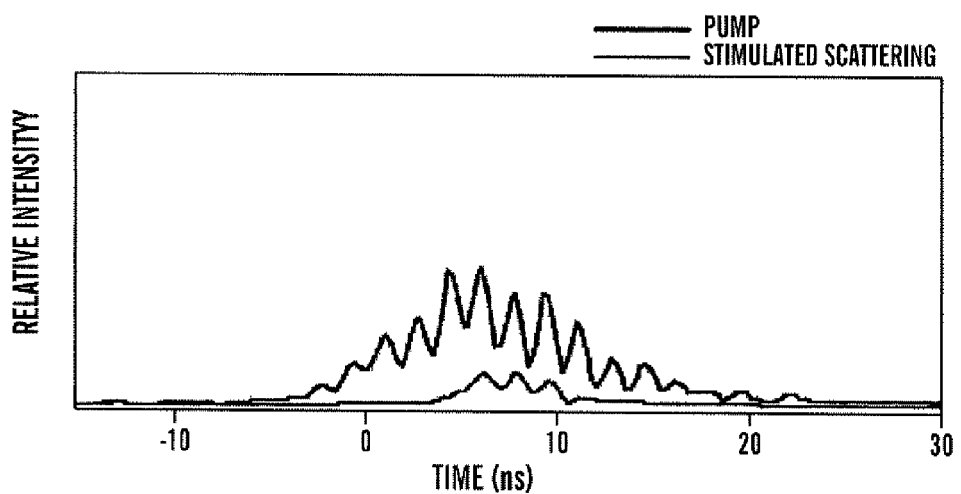
FIGS. 8A-C show measured waveforms of the pump pulse and backward stimulated Rayleigh scattering pulse at three input intensity levels. The pulse shapes of the input pump laser of 0.08 cm-1 line-width and the backward stimulated Rayleigh scattering from the dye-solution sample were measured by using a two channel 500-MHz digital oscilloscope (Infinium from HP), showing relative intensity (y-axis), in conjunction with two photodiodes providing a temporal resolution better than 1 ns (x-axis).
Figure 8B:
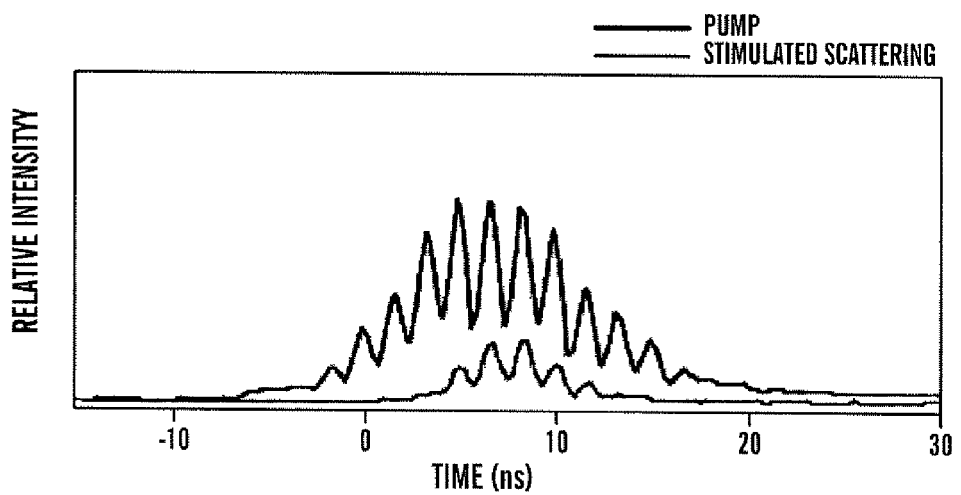
Figure 8C:
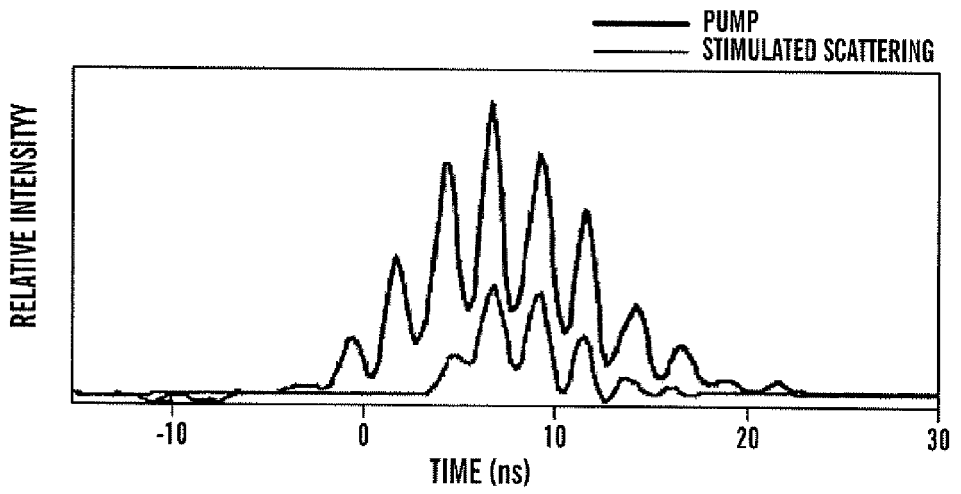
Figure 9A:
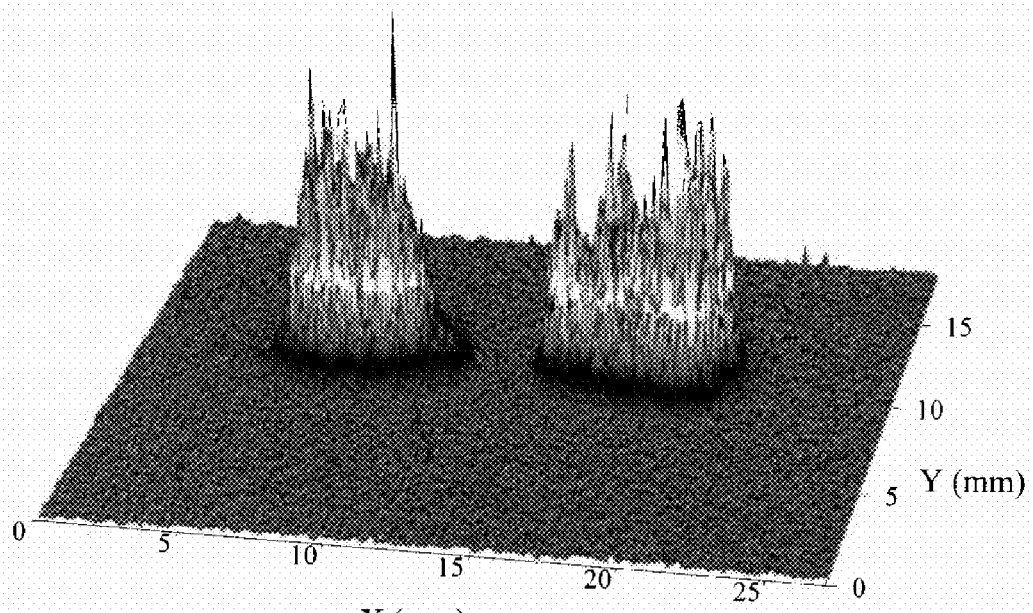
FIGS. 9A-B show the measured near-field patterns and far-field patterns of the pump beam and backward stimulated Rayleigh scattering beam at an input intensity level of 160 MW/cm$^2$. The near-field patterns (FIG. 9A) were obtained by projecting both the collimated pump beam and the backward stimulated beams on a ground-glass screen close to the sample position. The far-field patterns (FIG. 9B) were obtained by focusing these two beams via an f=100-cm lens on a screen located at the focal plane. In both cases, the images on the screen were recorded by a CCD camera.
Figure 9B:
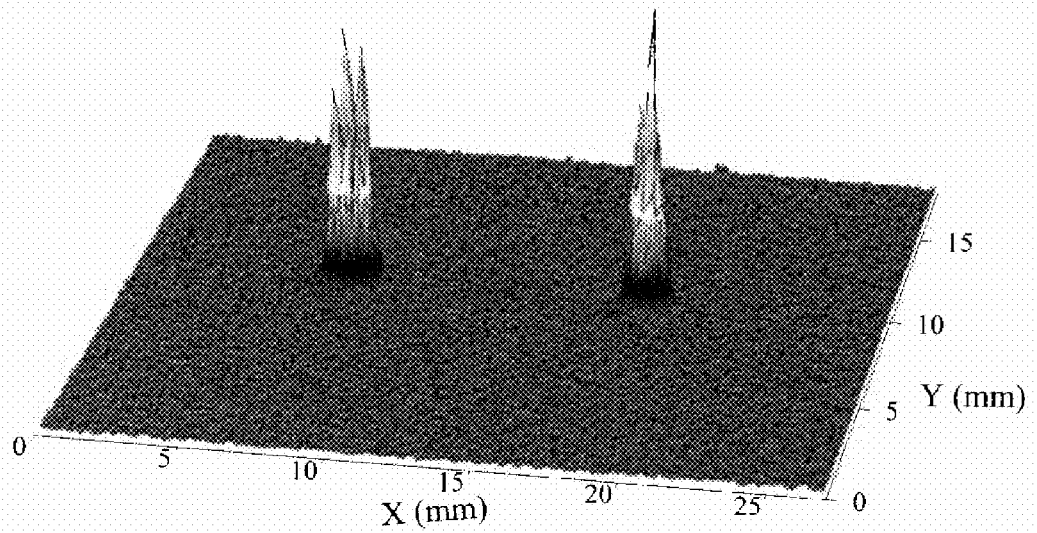

The measured waveforms of the input 532-nm pump pulse as well as the backward stimulated Rayleigh-Bragg scattering (SRBS) pulse at three different pump levels are shown in FIG. 8. On the other hand, the spatial structures of the backward stimulated scattering output beam can be characterized by measuring the near-field and far-field patterns. The measured near-field and far-field intensity distributions of the input pump beam and the backward SRBS from the dye solution cell are shown in FIG. 9. It is apparent that the backward SRBS beam has high directionality and good spatial coherence, as does the input pump laser beam. Based on the results shown in FIG. 9, one may conclude that the backward SRBS beam exhibits a very good optical phase-conjugate property.

Example 3

Optical Setup and Results for Two-Counter Propagating Beams Induced Bragg Grating Experiment To verify the validity of the model of grating reflection, a specially designed two counter-propagating beam coupling experiment was conducted. The experimental setup is shown in FIG. 10. The 532-nm laser output of ~0.6-cm$^{-1}$ linewidth from a Pockels' cell-switched Nd:YAG laser was split into two counter-propagating beams, a strong pump beam 1 and a very weak probe beam 2, expressing a large intensity difference (more than 600–6000x). Both beams were focused through two lenses of f=20 cm onto the center of a 1-cm path-length cuvette filled with PRL802 (0.01 M in THF). The crossing angle of these two beams was 177.5°. The energy change of pump beam 1 was controlled by rotating a polarizer prism, and a change in intensity ratio between the two beams was achieved by using a variable neutral-density filter. The gain of beam 2 could be measured either by a boxcar averager (Model 4420 from Princeton Applied Research) or by a 500-MHz two-channel digital oscilloscope (Infinium from Hewlett Packard).

It is possible to observe a two-beam induced Bragg grating and energy transfer from the strong beam 1 to the much weaker beam 2, owing to the reflection from the induced grating. As an illustration, FIG. 11 shows the measured gain behavior of beam 2 as a function of the energy of beam 1 when the same intensity (energy) ratio of ξ=I$_2$/I$_1$ was maintained. Each data point represents an average over 6 pulses of 532-nm laser with a repetition rate of 5.0 Hz. Based on the measured signal levels of beam 2 with and without interacting with beam 1, the relative gain of beam 2 as a function of energy of beam 1 can be easily determined. According to Equation (27), the energy transfer from beam 1 to 2 can be written as:

$$\Delta I_1 = RI_1 \approx (2\pi n_2 L/\lambda_0)^2 \cdot I_1^2 I_2 \propto I_1^2 I_2. \tag{30}$$

If it is assumed that the energy loss due to grating reflection for beam 2 is negligible, because of R<<1, the relative gain of beam 2 can be expressed as:

$$G = \Delta I_1/I_2 \propto I_1^2. \tag{31}$$

This simple equation implies two important predictions: (i) the gain G is proportional to I$_1^2$ and (ii) the gain G is independent of I$_2$, provided I$_1$>>I$_2$ and R<<1. The first prediction is proven by the results shown in FIG. 12, where the hollow circles represent the measured G values as a function of the energy values of beam 1, while the dashed line represents a fitting curve using a square law equation, i.e. y=ax². To verify the second prediction, relative gain behavior of beam 2 at its different input energy values, while keeping the same energy ($I_1$) level for beam 1, was measured. The boxcar measured gain behaviors are shown in FIG. 13, while FIG. 14 shows that that the measured G values are basically independent of the $I_2$ values within the experimental uncertainty. This is experimental proof of the second prediction mentioned above. Absolute values of the induced grating's reflectivity can also be determined through the measured gain values of beam 2. From Equations (30) and (31), the following equation applies:

$$R = \Delta I_1/I_1 = GI_2/I_1. \tag{32}$$

Based on the measured data shown in FIG. 14A, the values of reflectivity R are displayed in FIG. 14B, as a function of $I_2$ under the condition of a fixed $I_1$. In this specific case, it can be seen that the grating reflectivity R is proportional to the intensity (energy) of beam 2, as predicted by Equation (32). As mentioned above, an increase of the weak signal beam will further enhance the reflectivity and allow it to get still more energy from the strong pump beam. That is the positive feedback mechanism needed for generating stimulated scattering.

Example 4

Temporal Profiles for the Input and Output Pulse of Beam 2

The gain behavior of weak beam 2 can be measured by using a high-speed oscilloscope system, as shown in FIG. 10. In the case of utilizing a boxcar averager, the measured data were based on a double temporal average: firstly over a single laser pulse profile and then over 6 sequential laser pulses. In the case of utilizing an oscilloscope, the dynamic gain behavior of even an individual laser pulse can be recorded. In general, the 532-nm laser pulses from a Pockels' cell-switched Nd:YAG laser have a randomly fluctuating waveform and are poorly reproducible. This difficulty could be partially removed by utilizing a Pockels' cell and a BDN dye-doped polymer sheet together to improve the regularity of the laser pulse shape. FIGS. 15A-C show the simultaneously measured profiles of the input (dashed-line) and output (solid-line) pulses for beam 2 under these operation conditions. To obtain the results shown in FIG. 15A, the strong beam 1 was blocked and there was no grating inside the nonlinear medium. FIGS. 15B-C clearly show the enhancement effect of beam 2 due to grating reflection at two different energy levels of beam 1. After subtracting the dashed-line curve from the solid-line curve, the dynamic information of the gain for beam 2 as a function of time can be obtained. The remarkable features of the measured results shown in FIGS. 15B-C are: (i) the peak positions on the waveform for the amplified beam 2 are basically the same as that for the input pulse within a temporal resolution of ±0.5 ns and (ii) the amplified pulse shape of beam 2 remains symmetric as the input pulse. These two facts may imply a simplest case, i.e. a nearly instantaneous induced refractive-index change within the range of experimental uncertainty. Based on this assumption, the measured pulse shape of the amplified beam 2 can be well fitted by using a modified version of Equation (31) as follows:

$$G(t) = \Delta I_1(t)/I_2(t) \propto I_1^2(t). \tag{33}$$

Here, it should be noted that the relative pulse shapes for beams 1 and 2 were identical as they are from the same source.

Example 5

Measured Nonlinear Transmission of the Pump Beam vs. Input Pump Intensity

To verify the validity of the proposed physical model of grating reflection, this model was employed to fit the measured output/input relationship between the pump field and the stimulated scattering field. In FIG. 16A, the diamond points represent the measured nonlinear transmission values as a function of the pump intensity, where the attenuation of the pump beam is due to a pure 2PA process when the pump level is lower than the threshold of stimulated scattering and is due to both 2PA and backward stimulated scattering when the pump level is higher than the threshold. The best fitting curve for the pure 2PA process is obtained by assuming a 2PA coefficient β=9.46 cm/GW. In FIG. 16B, the circle points represent the measured output intensity values of the backward stimulated scattering as a function of the input pump intensity. To fit the output/input relationship shown in FIG. 16B, an average approximation can be used to determine the grating reflectivity by estimating the average local intensity for the two beams at the central position of the gain medium. To do so, the following expression for the average pump intensity inside the medium after considering 2PA-induced attenuation and the additional loss due to the grating reflection applies:

$$I_1' = I_1^0 \frac{\ln(1+\beta I_1^0 L/2)}{\beta I_1^0 L/2} T_0 (1-R/2). \tag{34}$$

Here, $I_1^0$ is the input pump intensity, β is the 2PA coefficient of the scattering medium, L is the path-length of the sample solution, $T_0$ is the linear transmission passing through L/2 of the medium, and R is the average reflectivity of the induced Bragg grating. The average intensity of the backward stimulated scattering inside the medium can be written as:

$$I_2' = I_1' R(1-R/2). \tag{35}$$

According to Equation (27):

$$R = th^2[(\pi n_2 L/\lambda_0)\sqrt{I_1' I_2'}]. \tag{36}$$

Substituting Equation (36) into Equations (34) and (35) provides a numerical solution for $I_2'$, and the final output intensity of the backward stimulated scattering can be modified as:

$$I_2 = I_2' \frac{\ln(1+\beta I_2' L/2)}{\beta I_2' L/2} T_0. \tag{37}$$

In the experimental conditions, L=1 cm, $T_0 \approx 0.95$ (due to one-window's reflection and residual linear attenuation), and β=9.46 cm/GW. Then, these values and the above expression are used to fit the experimental data. The fitting curve is shown in FIG. 16B by a dashed-line with a best-fitting parameter of $n_2 = 2.93 \times 10^{-7}$ cm²/MW. From FIG. 16B, one can see that the theoretical output/input relationship predicted by the grating reflection model is in fairly good agreement with the measured data within experimental uncertainty.

Example 6

Temporal Response of Thermal Refractive-Index Change

For most nonlinear optical experiments performed in linear or nonlinear absorbing media, the laser-absorption-induced thermal refractive-index changes are sometimes not negligible, particularly when a cw laser or a pulsed laser with high repetition rate is involved (Hoffman, H. J., "Thermally Induced Phase-Conjugation by Transient Real-Time Holograpy: A Review," *J Opt Soc Am B* 3:253-273 (1986), which is hereby incorporated by reference in its entirety). The thermal refractive-index change usually possesses a very long decay tail (up to microseconds or even milliseconds) after the laser action is gone. However, it is not quite clear how fast the maximum thermal refractive-index change can be reached upon the excitation of a short laser pulse of duration in nanoseconds or even shorter. It is specifically interesting to know whether the thermal refractive-index change plays an essential role in the stimulated scattering experiment. For this purpose, a pump-probe experiment was conducted by utilizing two beams with different wavelengths but propagating co-linearly along the same direction. The optical setup is schematically shown in FIG. 17, where a strong pulsed laser beam of 532-nm was focused through an f=10-cm lens onto the center of the same 1-cm sample solution, while another weak beam of 632.8-nm from a cw He—Ne laser was also focused via the same lens and co-linearly passed through the sample together with the 532-nm laser beam. As the thermal refractive-index change is caused by the local temperature and sequential density change, which is not wavelength-dependent, a pulsed 532-nm laser induced thermal refractive-index change can be detected by the 632.8-nm laser beam by utilizing an oscilloscope in conjunction with a PMT detector. The pulse energy and repetition rate of the 532-nm laser beam were ~45 µJ and 2 Hz. This focused 532-nm laser beam exhibited a nearly Gaussian local intensity distribution near the focal region and could induce a thermal self-defocusing effect, which might cause an impulsive change on the beam structure of the 632.8-nm probe beam. This change can be detected by placing a pinhole (~0.6 mm) at the outside edge of the central strong spot in the section of the diverging 632.8-nm beam after passing through the sample solution. Without the action of 532-nm laser pulses, the beam structure of the 632.8-nm laser beam doesn't change in time. Therefore, no impulsive signal could be detected by the PMT placed behind the pinhole (see FIG. 17). When two beams co-linearly pass through the sample solution, partial energy in the bright spot of the probe beam may shift into the pinhole area due to the dynamic self-defocusing inside the sample. This transient change of intensity distribution may lead to an impulsive increase of the 632.8-nm laser signal passing through the pinhole.

In FIG. 18A, the upper-trace is the pulsed waveform of the 532-nm laser beam (actively Q-switched) measured by the PMT detector behind the pinhole, while the lower-trace is that measured by a photodiode detector, which shows nearly the same temporal response of both detectors. The time delay between these two channels of the oscilloscope was adjusted to ensure the same peak position, and each trace was an average over 20 laser pulses. In FIG. 18B, the upper-trace represents the recorded profile of the 632.8-nm signal while the 532-nm laser beam was blocked in front of the sample. As expected, there was no temporal change of the probe beam. When two beams passed through the sample co-linearly, an apparent impulsive signal change of the 632.8-nm beam could be observed as shown in FIG. 18C. From such measured waveforms shown in FIG. 18C, one can see that the thermally induced refractive-index change reaches its first maximum value about 60-70 ns later than the arrival of the 532-nm laser pulse.

Figure 19A:
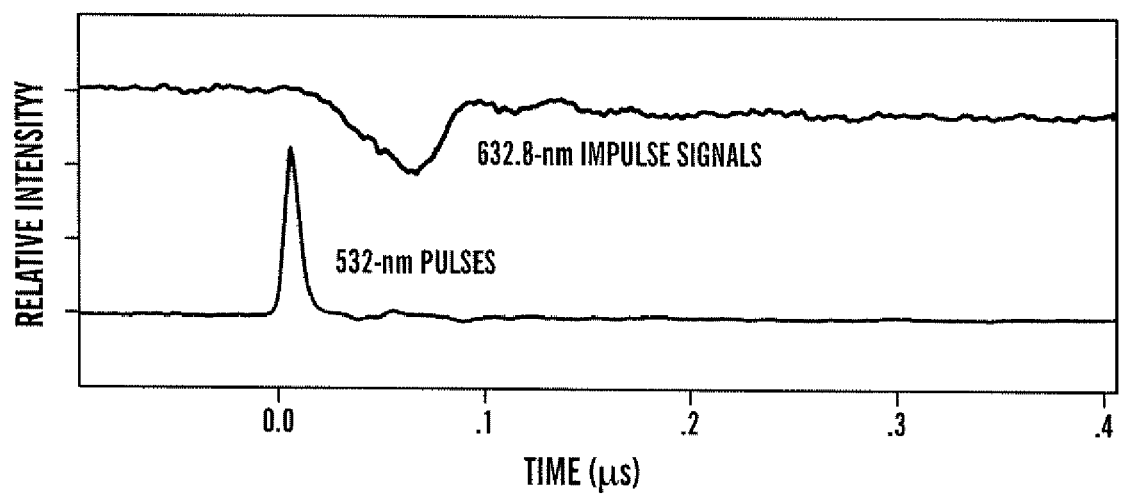
Figure 19B:
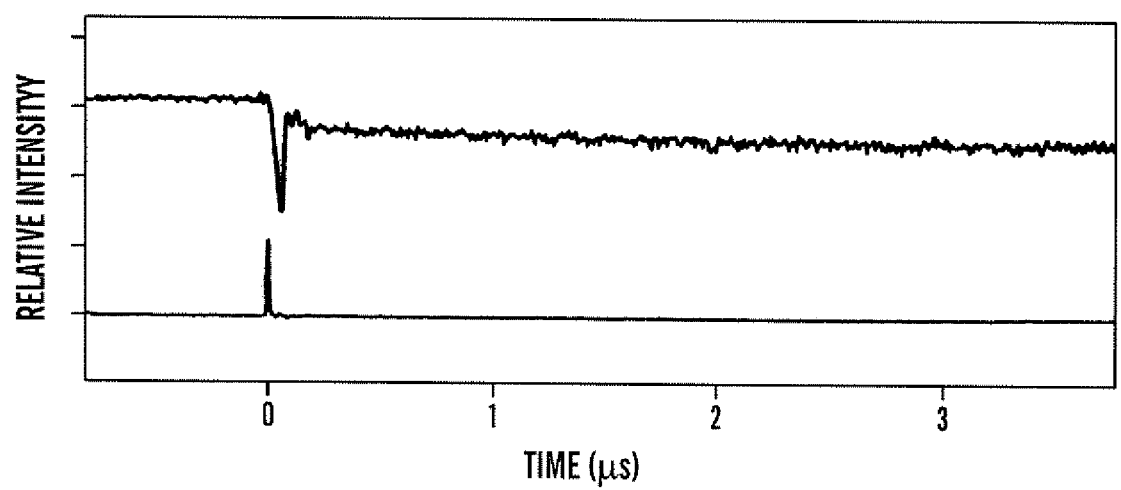
Figure 19C:
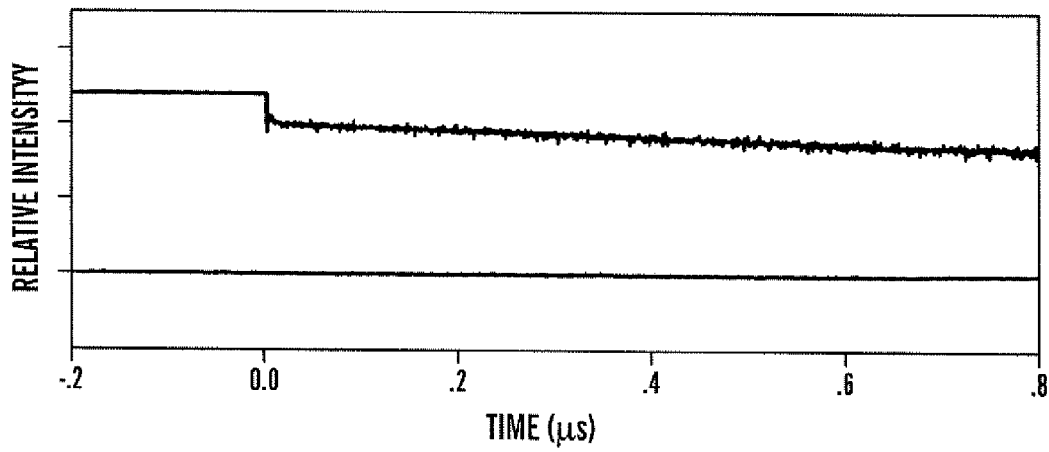
Figure 19D:
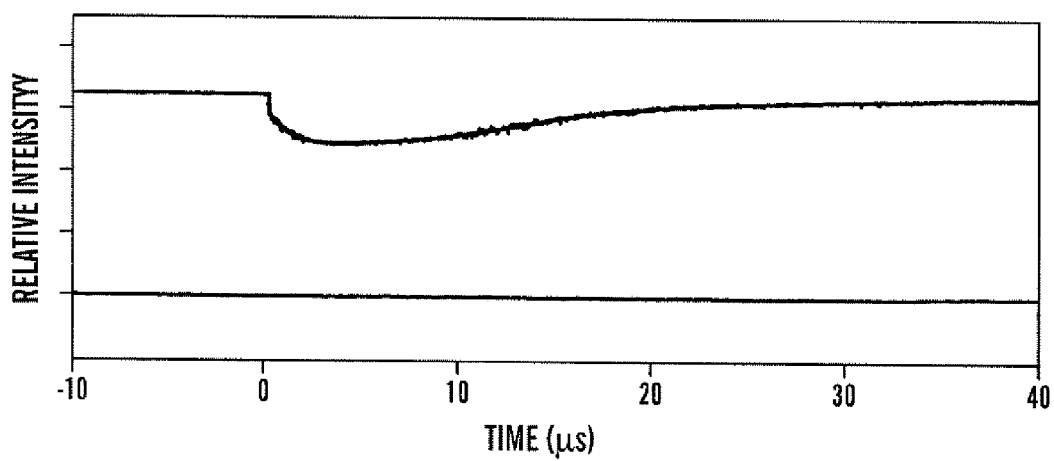

To examine the overall dynamic decay behavior of thermal refractive-index changes after the 532-nm laser pulse, several similar measurements were conducted on different and much longer time scales. The results of these measurements are shown in FIGS. 19A-B in microsecond regimes and FIGS. 19 C-D in millisecond regimes, respectively. The following salient features can be seen from FIG. 19: (i) the thermal refractive-index change ($\Delta n_T$) is negligible during the period of 532-nm laser pulse, (ii) after 2-3 ms $\Delta n_T$ reaches its second maximum value, and (iii) the decay time of $\Delta n_T$ after its second maximum may last for longer than 10-15 ms.

A system and method of generating backward stimulated Rayleigh Braggs scattering in a two-photon absorbing dye solution is presented. The system differs from other known stimulated scattering effects in that there is no measured frequency-shift within a spectral resolution better than one half of the pump laser line width and the measured pump threshold values are not dependent on the spectral line width of the pump laser. In addition, the two-photon absorbing medium provides resonance-enhanced refractive-index changes which enhance the efficiency of the induced Bragg grating while avoiding the harmful influence from linear absorption.

Although the invention has been described in detail for the purposes of illustration, it is understood that such detail is solely for that purpose, and variations can be made therein by those skilled in the art without departing from the spirit and scope of the invention as defined in the claims that follow.

What is claimed:

1. A method of generating backward stimulated Rayleigh-Bragg scattering, said method comprising:
providing a source of activating radiation, wherein the activating radiation has a wavelength of $\lambda_0$ and an intensity level of $I_L$;
providing a scattering cell containing a multi-photon active medium, wherein the medium has a nonlinear refractive index coefficient of $n_2$, a residual linear attenuation coefficient of $\alpha(\lambda_0)$ at wavelength $\lambda_0$, and a gain length greater than or equal to $\alpha(\lambda_0)/(2\pi n_2/\lambda_0)^2 I_L^2$; exhibits no linear/one-photon absorption but possesses multi-photon absorption at wavelength $\lambda_0$; and is designed to produce output radiation with backward stimulated Rayleigh-Bragg scattering from the activating radiation;
providing a first focusing lens positioned to focus the activating radiation into the scattering cell under conditions effective to permit multi-photon absorption within the scattering cell; and
directing activating radiation through said first focusing lens into said scattering cell containing scattering medium, thereby producing output radiation with backward stimulated Rayleigh-Bragg scattering.

2. The method according to claim 1, wherein the output radiation possesses the same frequency as said activating radiation.

3. The method according to claim 1, wherein the output radiation possesses a different frequency from the activating radiation.

4. The method according to claim 1, wherein the source of activating radiation is a laser.

5. The method according to claim 4, wherein the laser is pumped.

6. The method according to claim 4, wherein the laser is pulsed.

7. The method according to claim 1, wherein said active medium comprises a multi-photon absorbing organic dye solution.

8. The method according to claim 1, wherein the multi-photon absorbing dye is has the following structure:

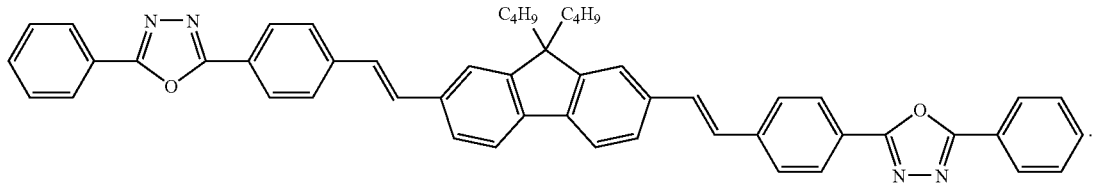

9. The method according to claim 1, wherein said source of activating radiation, said scattering cell, and said first focusing lens are positioned to direct the output radiation toward said source of activating radiation in a direction opposite the activating radiation leaving said source of activating radiation.

10. The method according to claim 1 further comprising: providing a beam splitter, wherein said source of activating radiation, said scattering cell, said first focusing lens, and said beam splitter are positioned to direct the output radiation in a direction opposite the activating radiation leaving said source of activating radiation until after the output radiation passes through said first focusing lens.

11. The method according to claim 10 further comprising: providing a second focusing lens, wherein said scattering cell is positioned between the first and second focusing lenses.

12. The method according to claim 1 further comprising: utilizing the activating radiation as an intracavity Q-switching element for Q-switched lasers.

13. The method according to claim 1, further comprising: utilizing the activating radiation as a cavity feedback element for laser oscillators.

14. The method according to claim 1, further comprising: utilizing the activating radiation to generate frequency degenerate optical phase-conjugated waves.

15. The method according to claim 1, wherein the multi-photon active medium is selected from the group consisting of a solution of various multi-photon absorbing dye compounds, a proper dye-doped solid rod, film, or waveguide, a multi-photon absorbing neat liquid dye or liquid crystal, and a multi-photon absorbing crystal or semiconductor.

* * * * *